(12) United States Patent
Matsumoto

(10) Patent No.: US 11,227,625 B2
(45) Date of Patent: Jan. 18, 2022

(54) STORAGE MEDIUM, SPEAKER DIRECTION DETERMINATION METHOD, AND SPEAKER DIRECTION DETERMINATION DEVICE

(71) Applicant: FUJITSU LIMITED, Kawasaki (JP)

(72) Inventor: Chikako Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/884,106

(22) Filed: May 27, 2020

(65) Prior Publication Data

US 2020/0381008 A1 Dec. 3, 2020

(30) Foreign Application Priority Data

May 31, 2019 (JP) .............................. JP2019-102058

(51) Int. Cl.
*G10L 25/78* (2013.01)
*G10L 25/51* (2013.01)
*H04R 5/04* (2006.01)
*H04R 3/00* (2006.01)

(52) U.S. Cl.
CPC .............. *G10L 25/78* (2013.01); *G10L 25/51* (2013.01); *H04R 3/005* (2013.01); *H04R 5/04* (2013.01); *G10L 2025/783* (2013.01); *H04R 2430/20* (2013.01)

(58) Field of Classification Search
CPC ......... G10L 25/78; G10L 25/51; G10L 25/18; G10L 21/023; G10L 21/0216; G10L 2021/02166; G10L 2025/783; H04R 1/406; H04R 5/04; H04R 3/005; H04R 3/04; H04R 29/006; H04R 2430/20;
(Continued)

(56) References Cited

U.S. PATENT DOCUMENTS

2004/0125894 A1 7/2004 Nakamura et al.
2011/0158426 A1* 6/2011 Matsuo .................. H04R 3/005
381/92

(Continued)

FOREIGN PATENT DOCUMENTS

JP 2000-151734 A 5/2000
JP 2011-186384 A 9/2011
(Continued)

*Primary Examiner* — Yogeshkumar Patel
(74) *Attorney, Agent, or Firm* — Fujitsu Patent Center

(57) ABSTRACT

A non-transitory computer-readable storage medium storing a program that causes a computer to execute a process, the process includes setting a plurality of speaker regions in different directions; calculating a phase difference in each of a plurality of different frequency bands on the basis of a plurality of sound signals acquired by the plurality of microphones; calculating a representative value of the number of phase differences belonging to each of a plurality of phase difference regions corresponding to each of the plurality of speaker regions on the basis of the calculated phase differences and the set plurality of speaker regions; comparing magnitudes of the calculated representative values; and determining, as a direction in which a speaker exists, a direction of a speaker region corresponding to a phase difference region where the compared representative value is large.

13 Claims, 24 Drawing Sheets

(58) Field of Classification Search
CPC ............ H04R 2410/01; H04R 2410/10; H04R 2499/13; G06F 40/58; G01S 3/8083
See application file for complete search history.

(56) References Cited

U.S. PATENT DOCUMENTS

2013/0166286 A1\* 6/2013 Matsumoto ............. G10L 21/02
704/205
2014/0241546 A1\* 8/2014 Matsumoto ............. H04R 3/04
381/86

FOREIGN PATENT DOCUMENTS

| JP | 2017-125893 A | | 7/2017 |
|---|---|---|---|
| JP | 2017125893 A | \* | 7/2017 |

\* cited by examiner

FIG. 22

|  | NARROW PHASE DIFFERENCE REGION [%] | WIDE PHASE DIFFERENCE REGION [%] |
|---|---|---|
| NO CORRECTION COEFFICIENT | 51.6 | 90.1 |
| FIXED CORRECTION COEFFICIENT | 59.8 | 100.0 |
| FLUCTUATING CORRECTION COEFFICIENT | 81.0 | 100.0 |

STORAGE MEDIUM, SPEAKER DIRECTION DETERMINATION METHOD, AND SPEAKER DIRECTION DETERMINATION DEVICE

CROSS-REFERENCE TO RELATED APPLICATION

This application is based upon and claims the benefit of priority of the prior Japanese Patent Application No. 2019-102058, filed on May 31, 2019, the entire contents of which are incorporated herein by reference.

FIELD

The embodiments relate to a storage medium, a speaker direction determination method, and a speaker direction determination device.

BACKGROUND

There is a technique that uses a microphone array including multiple microphones to determine a speaker direction, which is a direction in which a speaker exists, from utterance data. However, when trying to determine the speaker direction using the microphone array, if there is a lot of noise that is not the utterance of the target speaker, it becomes difficult to appropriately determine the speaker direction.

If the speaker direction is not appropriately determined, in a case where the executed process is switched by a wearable terminal including a microphone array or the like depending on the speaker direction, the process is not switched to an appropriate process. For example, in a case of switching between a translation source language and a translation target language by determining the speaker according to the speaker direction, translation is not performed appropriately unless the speaker direction is determined appropriately. Accordingly, there is a need for a technique for improving the speaker direction determination accuracy even in a highly noisy environment. For example, Japanese Laid-open Patent Publication No. 2017-125893, Japanese Patent No. 5387459, and the like are disclosed as related arts.

SUMMARY

According to an aspect of the embodiments, a non-transitory computer-readable storage medium storing a program that causes a computer to execute a process, the process includes setting a plurality of speaker regions in different directions; calculating a phase difference in each of a plurality of different frequency bands on the basis of a plurality of sound signals acquired by the plurality of microphones; calculating a representative value of the number of phase differences belonging to each of a plurality of phase difference regions corresponding to each of the plurality of speaker regions on the basis of the calculated phase differences and the set plurality of speaker regions; comparing magnitudes of the calculated representative values; and determining, as a direction in which a speaker exists, a direction of a speaker region corresponding to a phase difference region where the compared representative value is large.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 22 is a conceptual diagram exemplifying a speaker direction determination result;

DESCRIPTION OF EMBODIMENTS

When determining the speaker direction, it is conceivable to use the phase difference, that is, the difference in arrival time of sound. For example, when a microphone exists on an upper surface portion and a front surface portion of a terminal housing, sound from the front of the housing reaches the microphone on the front surface portion before reaching the microphone on the upper surface portion. On the other hand, sound from above the housing reaches the microphone on the upper surface portion before reaching the microphone on the front surface portion.

Whether the sound is from the front of the housing or from above the housing is determined by a preset model of the incident angle and phase difference of the sound and a determination boundary. However, in a highly noisy environment, the phase difference of noise is mixed with the phase difference of a sound signal in the frequency domain corresponding to the sound. Hence, it is difficult to appropriately determine the speaker direction.

In view of the above, it is desirable to improve the accuracy in determining the direction in which a speaker exists in a highly noisy environment.

First Embodiment

Figure 1:
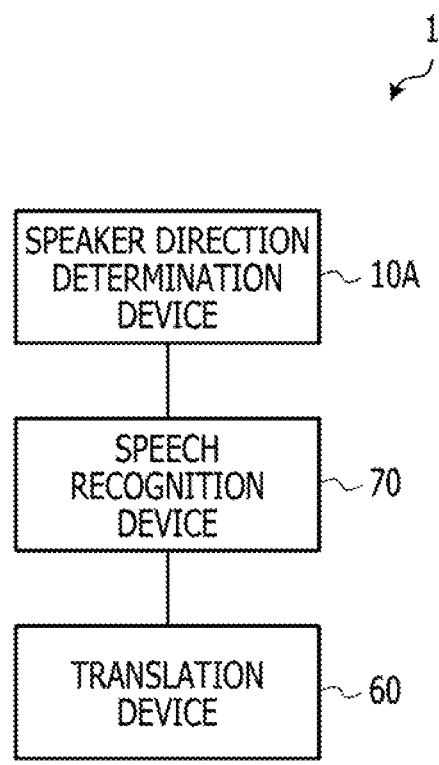
FIG. 1 is a block diagram exemplifying a translation system including a speaker direction determination device.

Hereinafter, an example of a first embodiment will be described in detail with reference to the drawings. In the first embodiment, a speaker region is set for each speaker, and representative values of the number of phase differences included in phase difference regions corresponding to the speaker regions are compared to determine the speaker direction which is the direction in which the speaker exists, FIG. 1 exemplifies a translation system 1. The translation system 1 includes a speaker direction determination device 10A, a speech recognition device 70, and a translation device 60. The speaker direction determination device 10A transmits the speaker direction determination result to the speech recognition device 70, and the speech recognition device 70 that receives the speaker direction determination result determines whether the sound signal is speech of a speaker P01 or speech of a speaker P02 on the basis of the determined speaker direction. If the speech is made by the speaker P01, the speech recognition device 70 performs speech recognition on the sound signal in a first language, and transmits the speech recognition result to the translation device 60. If the speech is made by the speaker P02, the speech recognition device 70 performs speech recognition on the sound signal in a second language, and transmits the speech recognition result to the translation device 60.

Using the received speech recognition result, if the speech is made by the speaker P01, the translation device 60 translates the first language into the second language and outputs the translation result as speech from a speaker, for example. Using the received speech recognition result, if the speech is made by the speaker P02, the translation device 60 translates the second language into the first language and outputs the translation result as speech from a speaker, for example.

Figure 2:
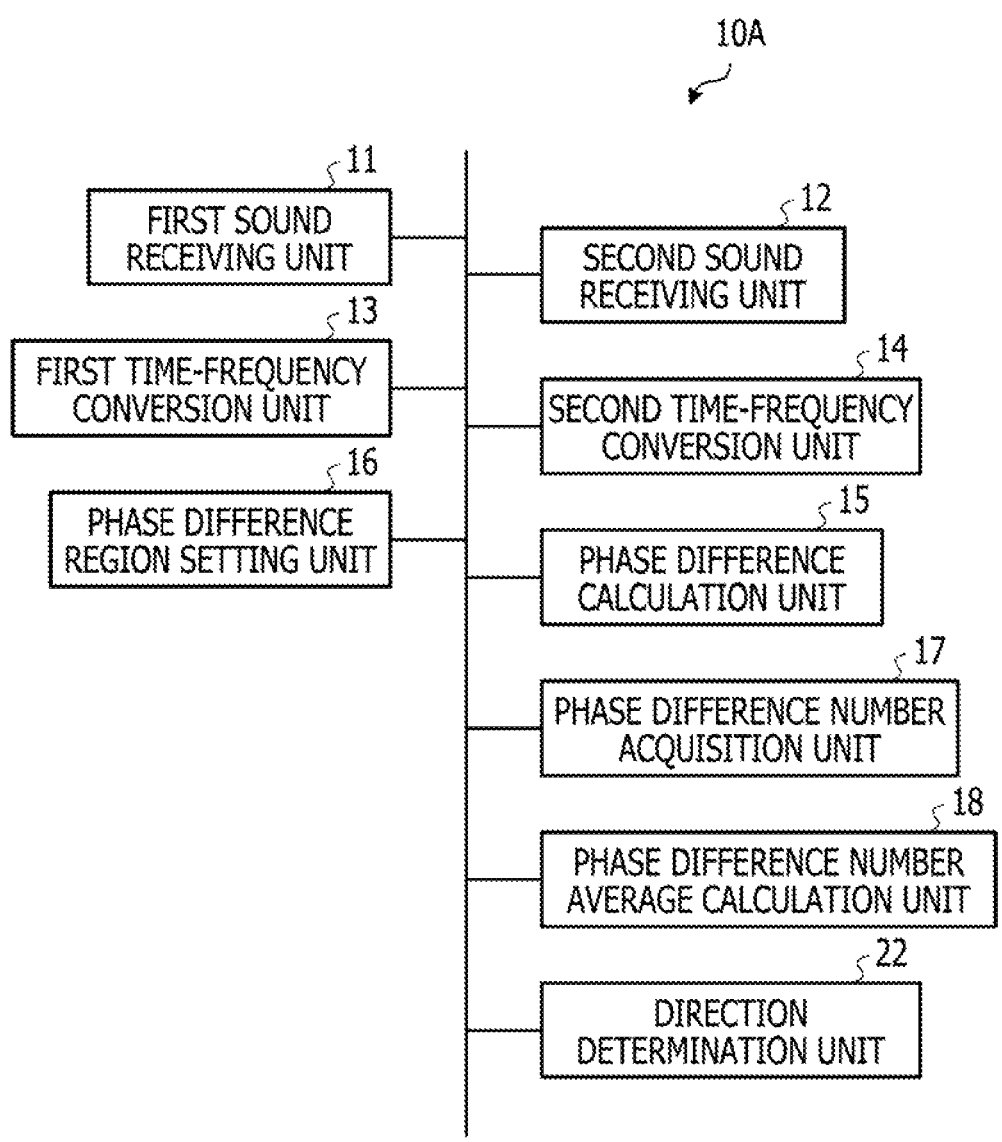
FIG. 2 is a block diagram exemplifying a speaker direction determination device according to a first embodiment.

FIG. 2 exemplifies the speaker direction determination device 10k The speaker direction determination device 10A includes a first sound receiving unit 11, a second sound receiving unit 12, a first time-frequency conversion unit 13, a second time-frequency conversion unit 14, a phase difference calculation unit 15, a phase difference region setting unit 16, a phase difference number acquisition unit 17, a phase difference number average calculation unit 18, and a direction determination unit 22.

The first sound receiving unit 11 receives a digital signal of a sound (hereinafter, a digital signal of a sound is referred to as a sound signal) in a time domain converted from an analog signal of a sound detected by a first microphone, and the second sound receiving unit 12 receives a sound signal in a time domain converted from an analog signal of a sound detected by a second microphone. The first time-frequency conversion unit 13 converts the time-domain sound signal received by the first sound receiving unit 11 into a frequency-domain sound signal using fast Fourier transformation (FFT), for example, and the second time-frequency conversion unit 14 converts the time-domain sound signal received by the second sound receiving unit 12 into a frequency-domain sound signal.

The phase difference calculation unit 15 calculates, far each frequency band of time-frequency conversion, a phase difference between the sound signal converted to the frequency domain by the first time-frequency conversion unit 13 and the sound signal converted to the frequency domain by the second time-frequency conversion unit 14.

The phase difference region setting unit 16, which is an example of a setting unit, sets a speaker region corresponding to each of the speakers and a phase difference region corresponding to each of the speaker regions. The speaker region is determined in advance according to the position, the moving range, and the like of the corresponding speaker. In the embodiment, a speaker region E01 corresponding to the speaker P01 and a speaker region E02 corresponding to the speaker P02 are set, and a phase difference region A01 corresponding to the speaker P01 and a phase difference region A02 corresponding to the speaker P02 are set.

Figure 3:
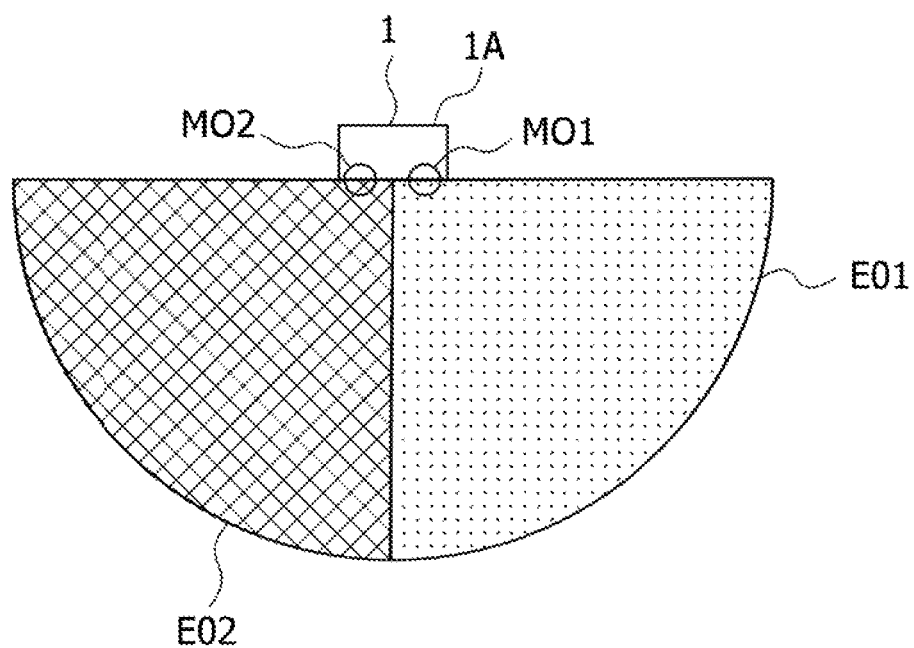
FIG. 3 is a conceptual diagram exemplifying speaker regions according to the first embodiment.

FIG. 3 exemplifies the speaker region E01 which is an area where the speaker P01 exists and the speaker region E02 which is an area where the speaker P02 exists. A first microphone M01 and a second microphone M02 are disposed close to each other on a front surface of a housing 1A of the translation system 1 including the speaker direction determination device 10A. FIG. 3 is a diagram of the housing 1A as viewed from above.

The speaker regions E01 and E02 are set in different directions with respect to the microphone array including the first microphone M01 and the second microphone M02. In the embodiment, an example will be described in which an angle of a vertex of the speaker region E01 in contact with the base point is substantially equal to an angle of a vertex of the speaker region E02 in contact with the base point. Note that the areas of the speaker regions E01 and E02 exemplified in FIG. 3 are an example, and the areas may be larger or smaller than those exemplified in FIG. 3.

Figure 4:
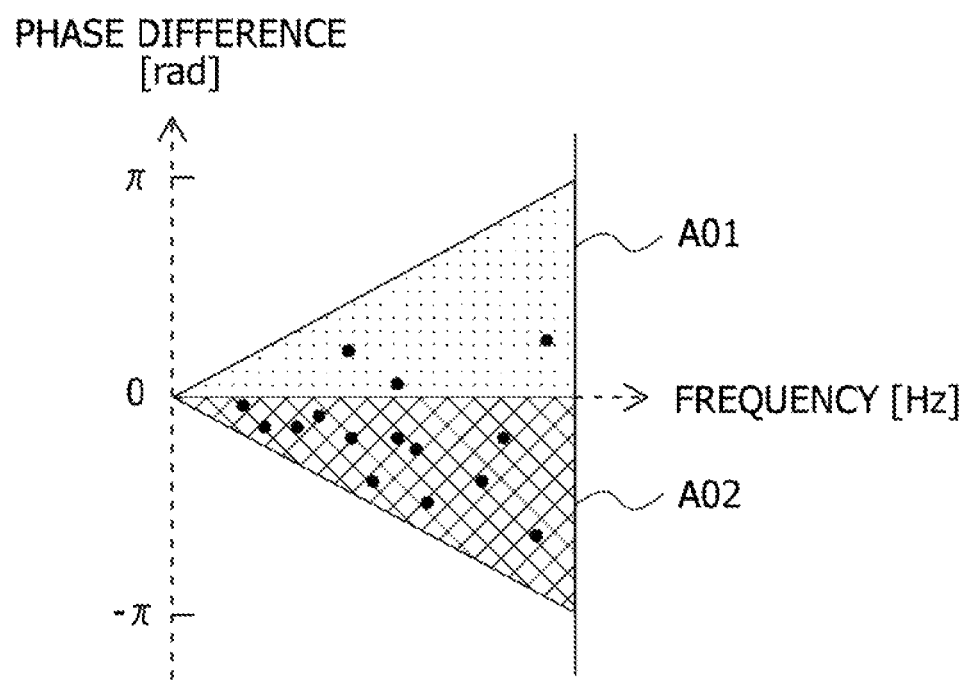
FIG. 4 is a conceptual diagram exemplifying phase differences included in phase difference regions.

FIG. 4 exemplifies phase difference regions when the speaker regions E01 and E02 are set as exemplified in FIG. 3. The phase difference region A01 in FIG. 4 corresponds to the speaker region E01 in FIG. 3, and the phase difference region A02 in FIG. 4 corresponds to the speaker region E02 in FIG. 3.

The phase difference number acquisition unit 17 in FIG. 2 acquires a phase difference number which is the number of phase differences included in the phase difference region A01 in FIG. 4, and obtains a phase difference number which is the number of phase differences included in the phase difference region A02. FIG. 4 exemplifies phase differences included in each of the phase difference region A01 and the phase difference region A02 at a predetermined time. In FIG.

4, the vertical axis represents the phase difference [rad], and the horizontal axis represents the frequency [Hz]. In FIG. 4, the phase difference is represented by a circle. In the example of FIG. 4, the phase difference number of the phase difference region A02 is larger than the phase difference number of the phase difference region A01.

The phase difference number average calculation unit 18, which is an example of a representative value calculation unit, calculates the time average of the phase difference number of the phase difference region A01 and the time average of the phase difference number of the phase difference region A02. The time average of a phase difference number is an example of a representative value of a phase difference number. A time average $AvrN_t$ of the phase difference number of a target phase difference region of an FFT target frame t is calculated using equation (4), for example.

$$AvrN_t = (1.0-\gamma) \times AvrN_{t-1} + \gamma \times_t \qquad (4)$$

$\gamma$ is a forgetting coefficient ($\gamma<1.0$), $AvrN_{t-1}$ is a time average of the phase difference number of a frame t−1 immediately before the target frame t, and $N_t$ is the number of phase differences included in the target phase difference region in the target frame t. Note that the representative value is not limited to the time average, and may be an average of the phase difference numbers of a predetermined number of frames before and after the target frame, or an intermediate value of the phase difference numbers of the predetermined number of frames before and after the target frame.

The direction determination unit 22, which is an example of a determination unit, determines the speaker direction by comparing the time average of the phase difference number of the phase difference region A01 with the time average of the phase difference number of the phase difference region A02. That is, it is determined that the speaker exists on the side of the phase difference region where the time average of the phase difference number is larger.

Figure 5:
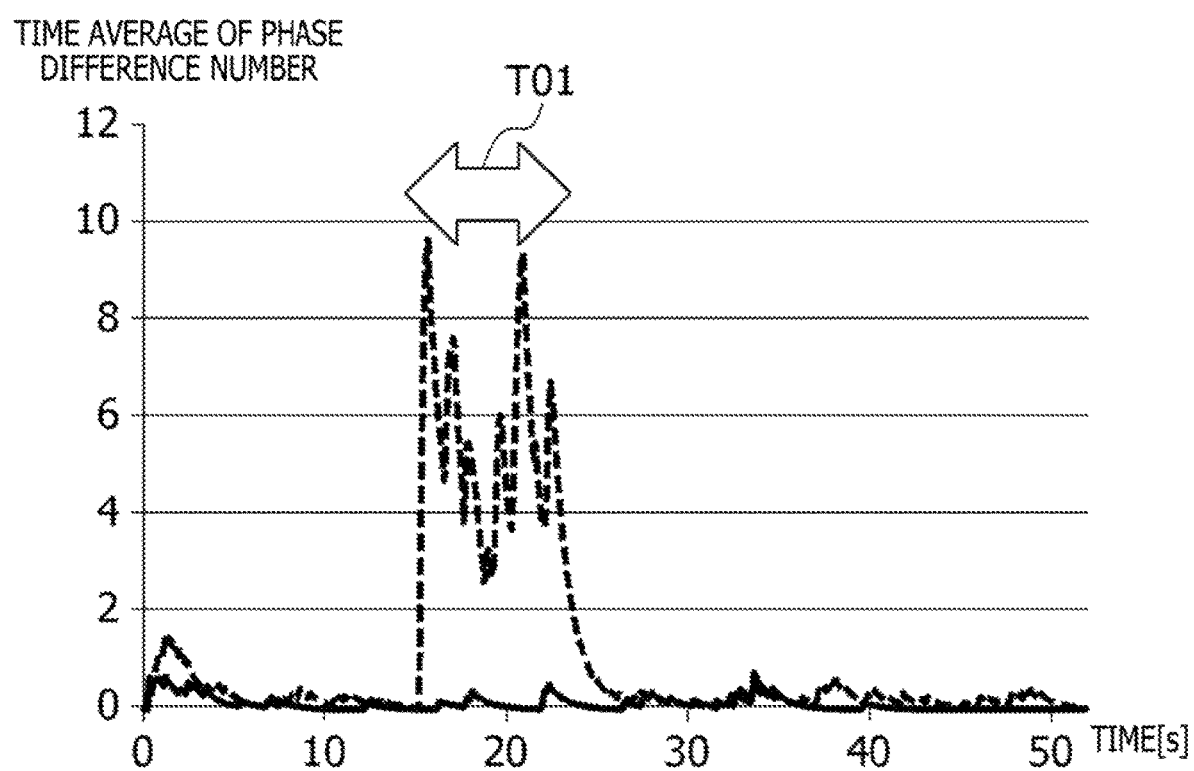
FIG. 5 is a conceptual diagram exemplifying the number of phase differences in a phase difference region.

FIG. 5 exemplifies the time average of the phase difference number of the phase difference region A01 and the time average of the phase difference number of the phase difference region A02. In FIG. 5, the vertical axis represents the time average of the phase difference number, and the horizontal axis represents time [s]. In FIG. 5, the solid line represents the time average of the phase difference number of the phase difference region A01 and the broken line represents the time average of the phase difference number of the phase difference region A02.

For example, at time T01, the time average of the phase difference number of the phase difference region A02 is larger than the time average of the phase difference number of the phase difference region A01. Accordingly, the direction determination unit 22 determines that the speaker P02 is speaking.

Figure 6:
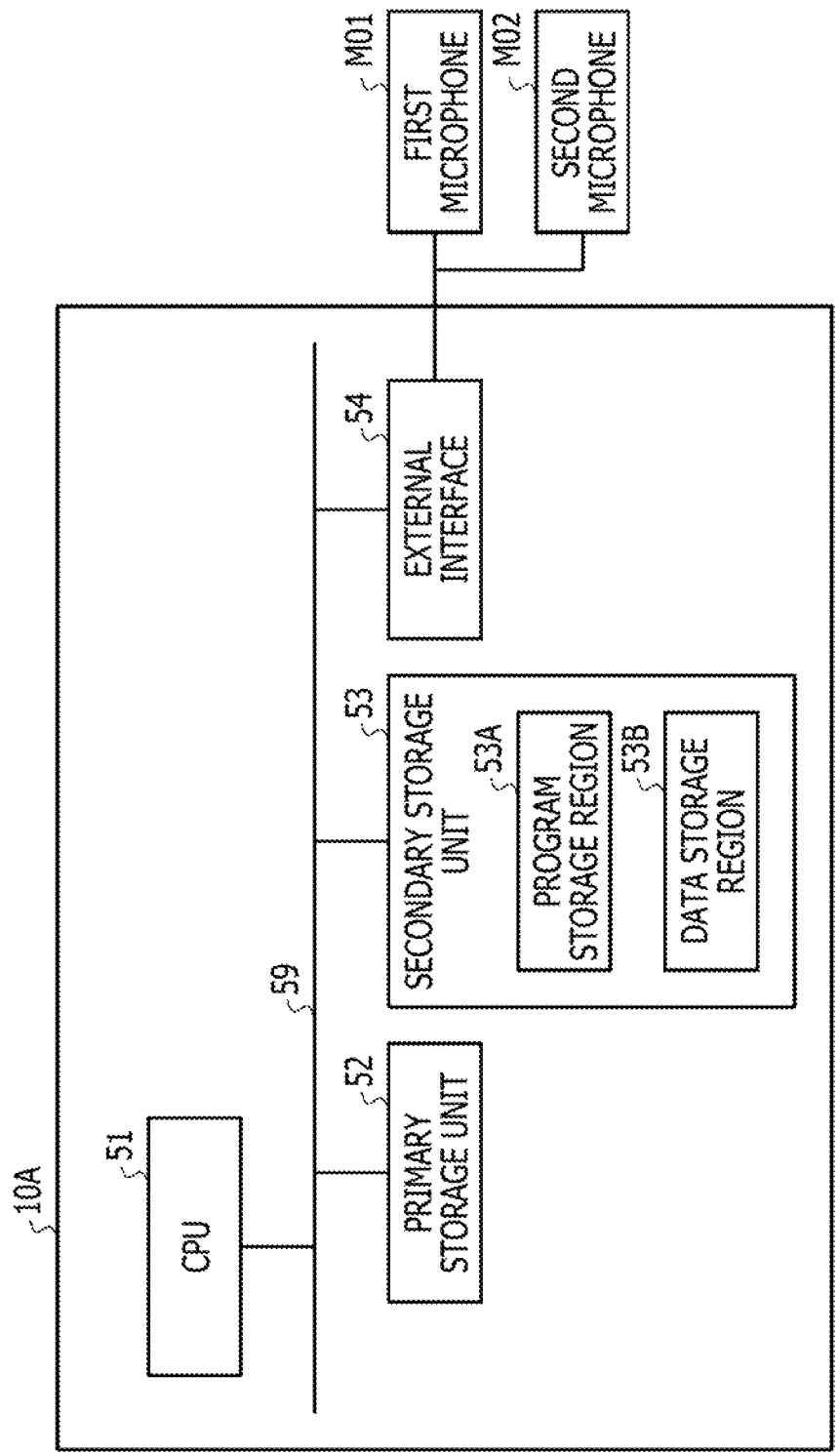
FIG. 6 is a block diagram exemplifying a hardware configuration of a speaker direction determination device according to first to fourth embodiments.

For example, as illustrated in FIG. 6, the speaker direction determination device 10A includes a central processing unit (CPU) 51, a primary storage unit 52, a secondary storage unit 53, an external interface 54, the first microphone M01, and the second microphone M02. The CPU 51 is an example of a processor that is hardware. The CPU 51, the primary storage unit 52, the secondary storage unit 53, the external interface 54, the first microphone M01, and the second microphone M02 are mutually connected through a bus 59.

The primary storage unit 52 is a volatile memory such as a random access memory (RAM), for example. The secondary storage unit 53 is a nonvolatile memory such as a hard disk drive (HDD) or a solid state drive (SSD), for example.

The secondary storage unit 53 includes a program storage region 53A and a data storage region 53B. For example, the program storage region 53A stores a program such as a speaker direction determination program. For example, the data storage region 53B stores information regarding phase difference regions, intermediate data generated during execution of the speaker direction determination program, and the like.

The CPU 51 reads out the speaker direction determination program from the program storage region 53A and expands it in the primary storage unit 52. The CPU 51 loads and executes the speaker direction determination program to operate as the first sound receiving unit 11, the second sound receiving unit 12, the first time-frequency conversion unit 13, and the second time-frequency conversion unit 14 in FIG. 2. The CPU 51 also operates as the phase difference calculation unit 15, the phase difference region setting unit 16, the phase difference number acquisition unit 17, the phase difference number average calculation unit 18, and the direction determination unit 22.

Note that a program such as a speaker direction determination program may be stored in an external server, and be developed in the primary storage unit 52 through a network. Alternatively, a program such as a speaker direction determination program may be stored in a nontemporary recording medium such as a digital versatile disc (DVD), and be developed in the primary storage unit 52 through a recording medium reading device.

An external device is connected to the external interface 54, and the external interface 54 controls transmission and reception of various information between the external device and the CPU 51. The first microphone M01 and the second microphone M02 are connected as external devices to the speaker direction determination device 10A through the external interface 54. The first microphone M01 and the second microphone M02 detect sound.

In another conceivable configuration, only the speaker direction determination device 10A is included in the housing 1A, and the speaker direction determination result is transmitted to the speech recognition device 70 by wired or wireless communication through the external interface 54. The translation system 1 including speaker direction determination device 10A may be a personal computer, a smartphone, or a dedicated device for example.

Figure 7:
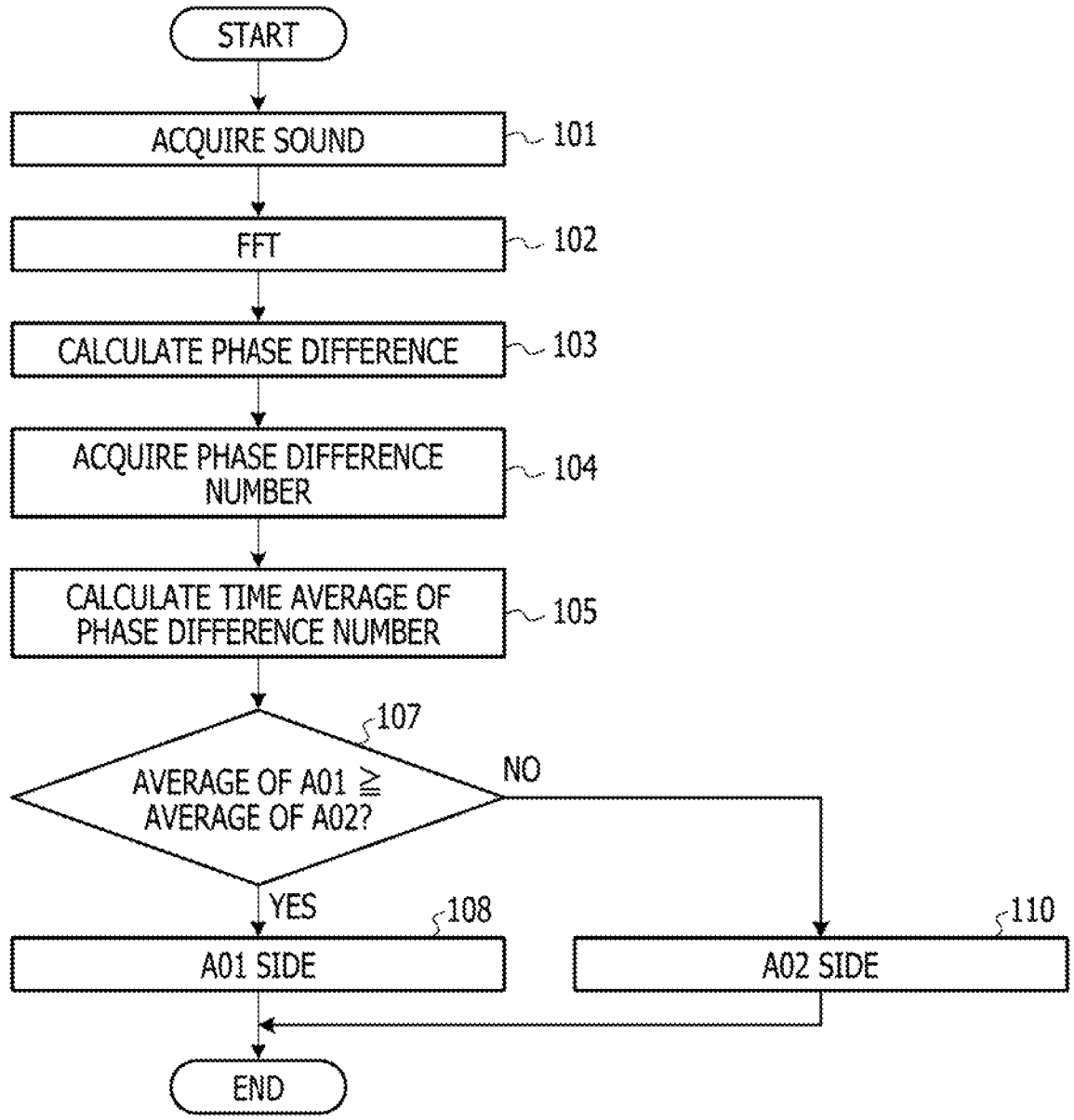
FIG. 7 is a flowchart exemplifying a flow of a speaker direction determination process according to the first embodiment.

Next, an outline of the operation of the speaker direction determination process will be described. FIG. 7 exemplifies the flow of the speaker direction determination process.

In step 101, the CPU 51 acquires a sound signal in the time domain corresponding to the sound detected by each of the first microphone M01 and the second microphone M02. In step 102, the CPU 51 converts each of the acquired time-domain sound signals into a frequency-domain sound signal. The conversion is performed by fourier frequency transformation (FFT), for example.

In step 103, the CPU 51 calculates a phase difference for each frequency band of the frequency-domain sound signal. In step 104, the CPU 51 acquires the number of phase differences included in each of the phase difference regions corresponding to each of the speaker regions for each speaker set in advance. The CPU 51 acquires, for example, the number of phase differences included in the phase difference region A01 of the speaker P01 and the number of phase differences included in the phase difference region A02 of the speaker P02.

In step 105, the CPU 51 calculates a time average of the phase difference number of each of the phase difference regions. Specifically, the CPU 51 calculates a time average of the phase difference number of the phase difference region A01 and a time average of the phase difference number of the phase difference region A02, for example.

In step 107, the CPU 51 compares the time averages of the phase difference number of the phase difference regions. For example, the CPU 51 compares the time average of the phase difference number of the phase difference region A01 with the time average of the phase difference number of the phase difference region A02.

If the time average of the phase difference number of the phase difference region A01 is equal to or greater than the time average of the phase difference number of the phase difference region A02, the CPU 51 proceeds to step 108 and determines that the speaker direction is on the phase difference region A01 side. If the phase difference region A01 is associated with the speaker P01, the CPU 51 determines that the speaker P01 is speaking, and ends the speaker direction determination process.

If the determination in step 107 is negative, that is, if the time average of the phase difference number of the phase difference region A01 is smaller than the time average of the phase difference number of the phase difference region A02, the CPU 51 proceeds to step 110. In step 110, the CPU 51 determines that the speaker direction is on the phase difference region A02 side. If the phase difference region A02 is associated with the speaker P02, the CPU 51 determines that the speaker P02 is speaking, and ends the speaker direction determination process.

Note that the embodiment is not limited to two microphones. Three or more microphones may be used. Additionally, the embodiment is not limited to two phase difference regions. Three or more phase difference regions may be set.

In the embodiment, multiple speaker regions are set in different directions with respect to a microphone array including multiple microphones, and the phase difference in each of multiple different frequency bands is calculated on the basis of multiple sound signals acquired by the multiple microphones. Based on the calculated phase differences and the set multiple speaker regions, a representative value of the number of phase differences belonging to each of the multiple phase difference regions corresponding to each of the multiple speaker regions is calculated. The magnitudes of the calculated representative values are compared, and the direction of the speaker region corresponding to the phase difference region having the larger representative value is determined to be the direction in which the speaker exists.

In the embodiment, since the speaker direction is determined on the basis of the representative value of the number of phase differences in each of the multiple phase difference regions, it is possible to improve the accuracy in determining the direction in which a speaker exists in a highly noisy environment.

Second Embodiment

Hereinafter, an example of a second embodiment will be described in detail with reference to the drawings. The description of the configuration and operation similar to those of the first embodiment will be omitted.

Figure 8:
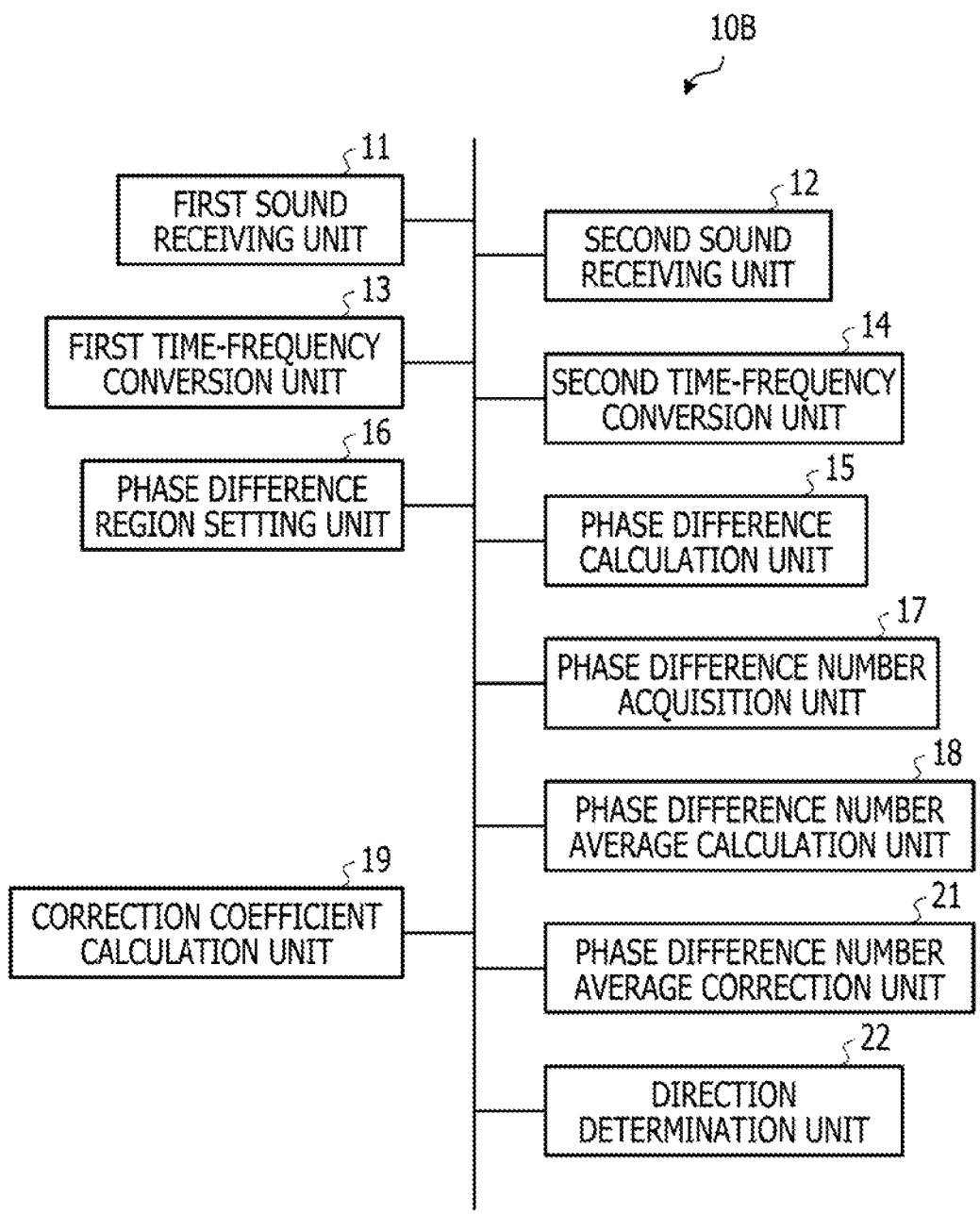
FIG. 8 is a block diagram exemplifying a speaker direction determination device according to the second embodiment.

The second embodiment differs from the first embodiment in that the sizes of the multiple phase difference regions are different from one another. A speaker direction determination device 108 exemplified in FIG. 8 differs from the speaker direction determination device 10A of the first embodiment exemplified in FIG. 2 in that the speaker direction determination device 10B includes a correction coefficient calculation unit 19 and a phase difference number average correction unit 21.

Figure 9:
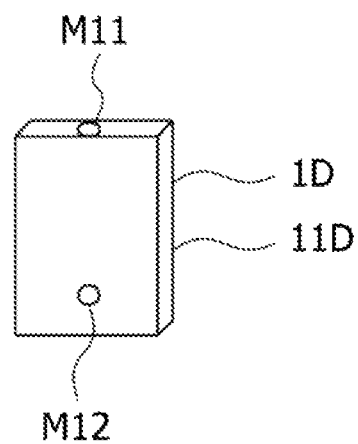
FIG. 9 is a conceptual diagram exemplifying the appearance of a translation system including a speaker direction determination device.

In the second embodiment, as exemplified in FIG. 9, a first microphone M11 is disposed on an upper surface of a housing 11D of a translation system 1D including a speaker direction determination device, and a second microphone M12 is disposed on a front surface of the translation system 1D.

Figure 10:
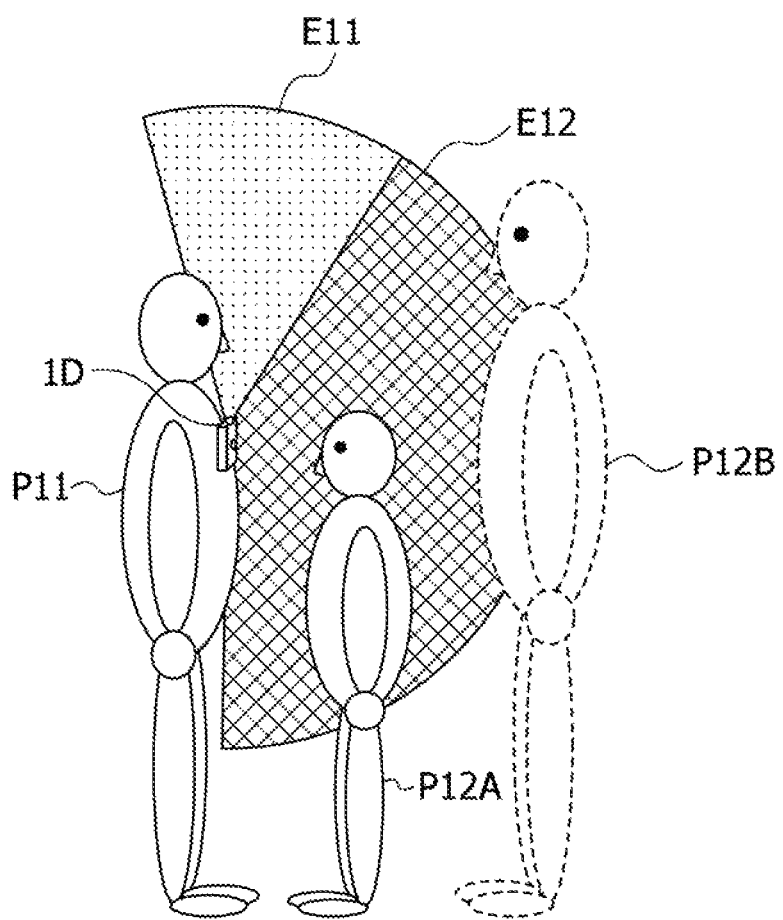
FIG. 10 is a conceptual diagram exemplifying speaker regions.

As exemplified in FIG. 10, a case is assumed where a speaker P11 wearing the translation system 1D on his/her chest so that the back of the housing 11D faces the speaker side interacts with a speaker P12A who is shorter than the speaker P11. Another case is assumed where the speaker P11 talks with a speaker P12B who is taller than the speaker P11.

In such a case, as exemplified in FIG. 10, a second speaker region E12 that can address both the speakers P12A and P12B is set wider than a first speaker region E11 in which the speaker P11 exists. On the other hand, the first speaker region E11 can be set relatively narrow on the basis of the mounting position of the translation system 1D including the speaker direction determination device 10B and the position of the speaker P11's mouth.

Figure 11:
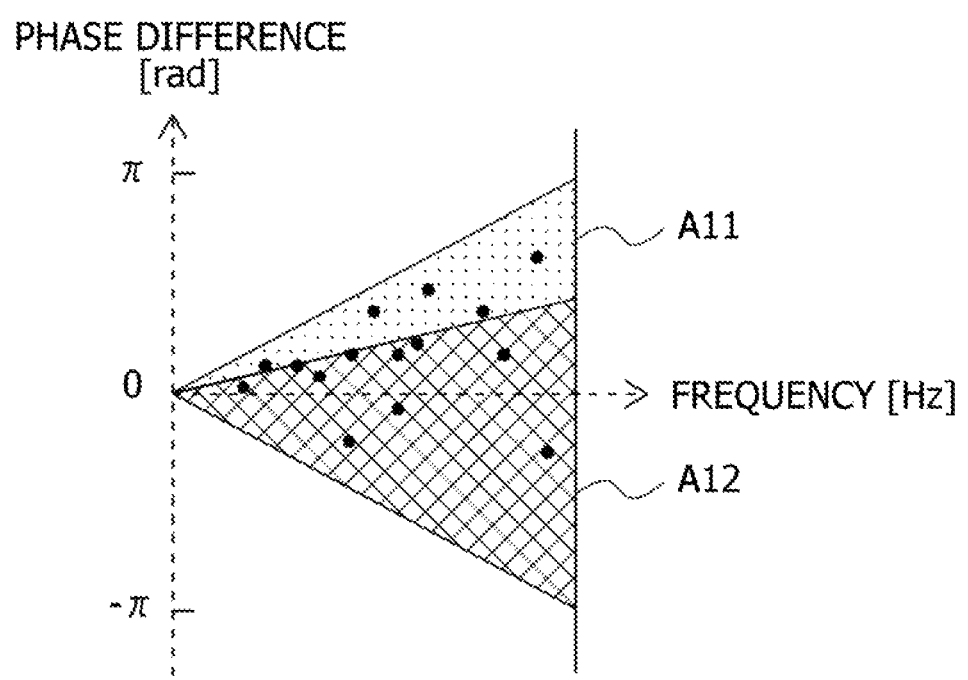
FIG. 11 is a conceptual diagram exemplifying phase differences included in phase difference regions.

FIG. 11 exemplifies phase difference regions when speaker regions are set as exemplified in FIG. 10. A first phase difference region A11 in FIG. 11 corresponds to the first speaker region E11 in FIG. 10, and a second phase difference region A12 in FIG. 11 corresponds to the second speaker region E12 in FIG. 10. As exemplified in FIG. 10, since the first speaker region E11 is narrow and the second speaker region E12 is wide, the first phase difference region A11 corresponding to the first speaker region E11 is set narrow, and the second phase difference region A12 corresponding to the second speaker region E12 is set wide.

Since the second phase difference region A12 is wider than the first phase difference region A11, as exemplified in FIG. 11, the number of phase differences included in the second phase difference region A12 tends to be larger than the number of phase differences included in the first phase difference region A11. This because a wider phase difference region tends to include more phase differences of noise. In FIG. 11, the vertical axis represents the phase difference [rad], and the horizontal axis represents the frequency [Hz]. In FIG. 11, the phase difference is represented by a circle.

Figure 12:
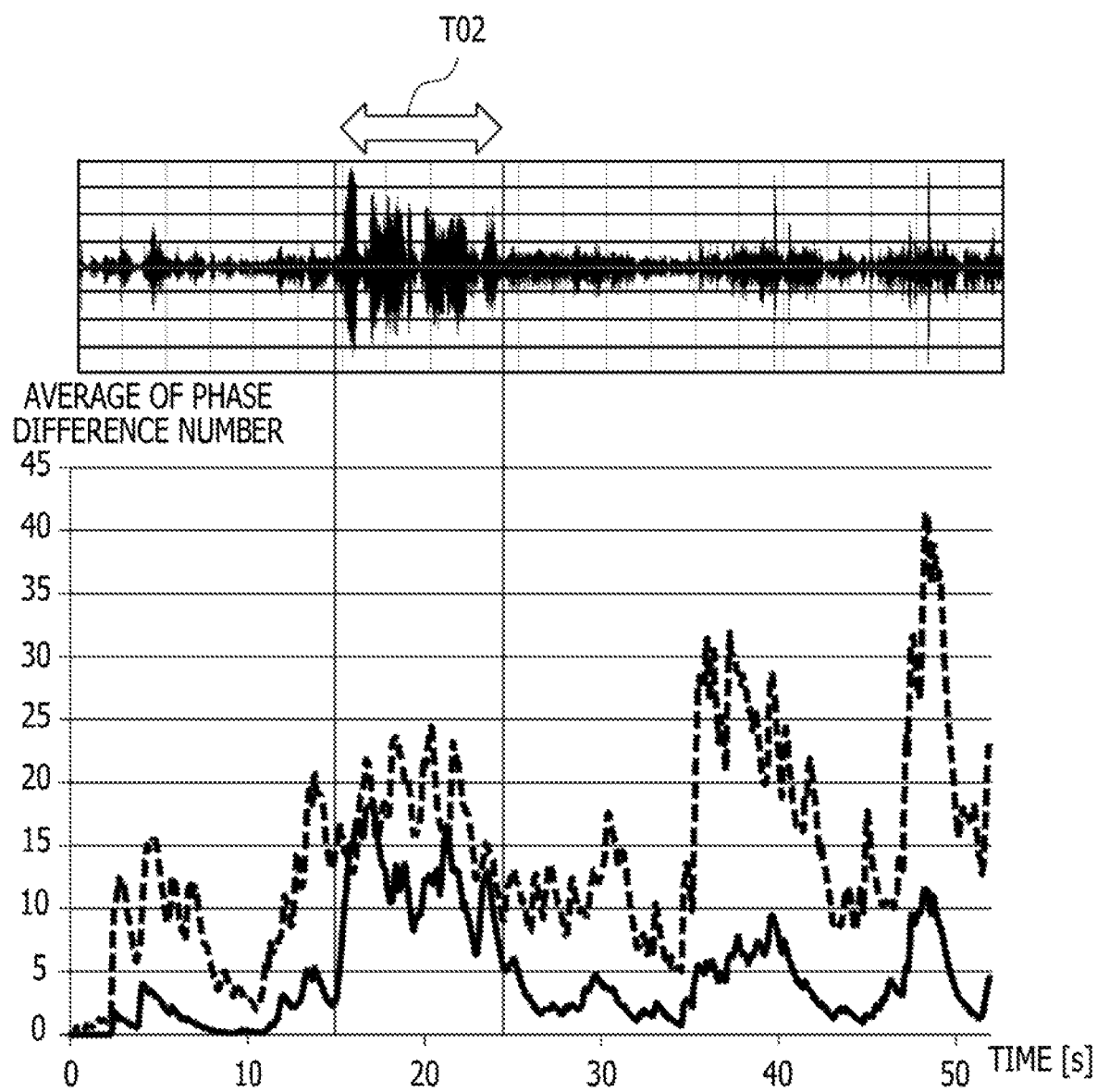
FIG. 12 is a conceptual diagram exemplifying a time average of the number of phase differences for each phase difference region.

In the lower diagram of FIG. 12, the time average of the phase difference number of the first phase difference region A11 is exemplified by a solid line, and the time average of the phase difference number of the second phase difference region A12 is exemplified by a broken line. In the lower diagram of FIG. 12, the vertical axis represents the average of the phase difference number, and the horizontal axis represents time [s].

Even at time T02, which is a speech time of the speaker P11 exemplified in the upper diagram of FIG. 12, the time average of the phase difference number of the first phase difference region A11 is smaller than the tune average of the phase difference number of the second phase difference region A12 as exemplified in the lower diagram of FIG. 12. As a result, if the time average of the phase difference number of the first phase difference region A11 is simply compared with the time average of the phase difference number of the second phase difference region A12, the speaker direction is not appropriately determined, and there is a possibility that the speech of the speaker P11 is erroneously recognized as the speech of the speaker P12A or P12B.

In the second embodiment, in order to prevent erroneous recognition, a correction coefficient is calculated on the basis of the second phase difference region A12, which is the wider phase difference region, and the calculated correction coefficient is used to correct the time average of the phase difference number of the second phase difference region, which is the narrower phase difference region. The correction coefficient calculation unit 19 calculates a correction coefficient on the basis of the size of the central angle of the speaker region, for example. That is, the correction coefficient is calculated from the area ratio of the speaker regions.

Figure 13:
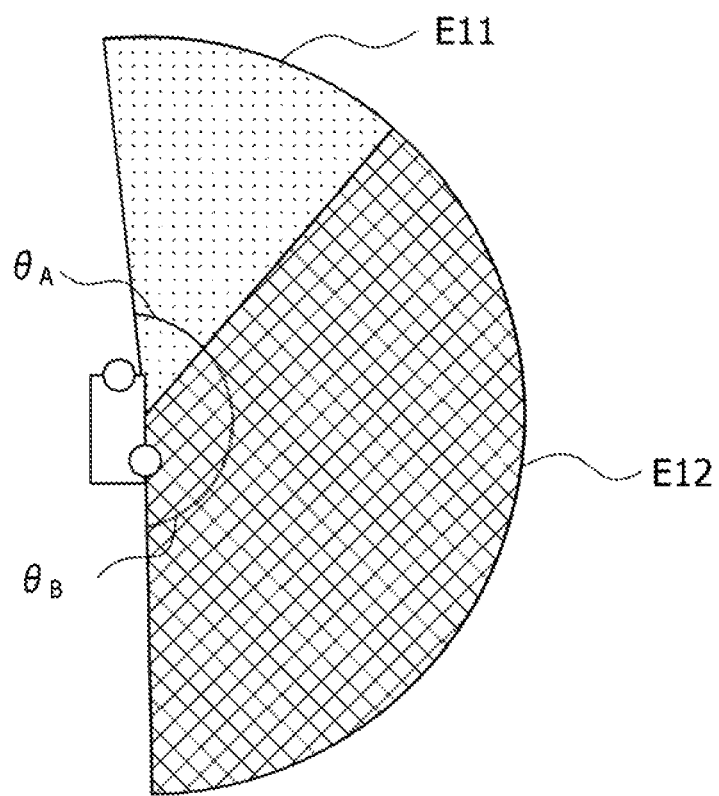
FIG. 13 is a conceptual diagram exemplifying speaker regions.

As exemplified in FIG. 13, when the angle of the vertex of the first speaker region E11 in contact with the base point is $\theta_A[°]$ and the angle of the vertex of the second speaker region E12 in contact with the base point is $\theta_B[°]$, a correction coefficient $\alpha_1$ is calculated using equation (5), for example.

$$\alpha_1 = (\pi r^2 \times \theta_B/360)/(\pi r^2 \times \theta_A/360) = \theta_B/\theta_A \quad (5)$$

Here, it is assumed that each of first speaker region E11 and second speaker region E12 has a sector shape included in a circle having a radius r. The phase difference number average correction unit 21 multiplies the time average of the phase difference number of the first phase difference region A11, which is the narrower phase difference region, by the correction coefficient $\alpha_1$.

Figure 14:
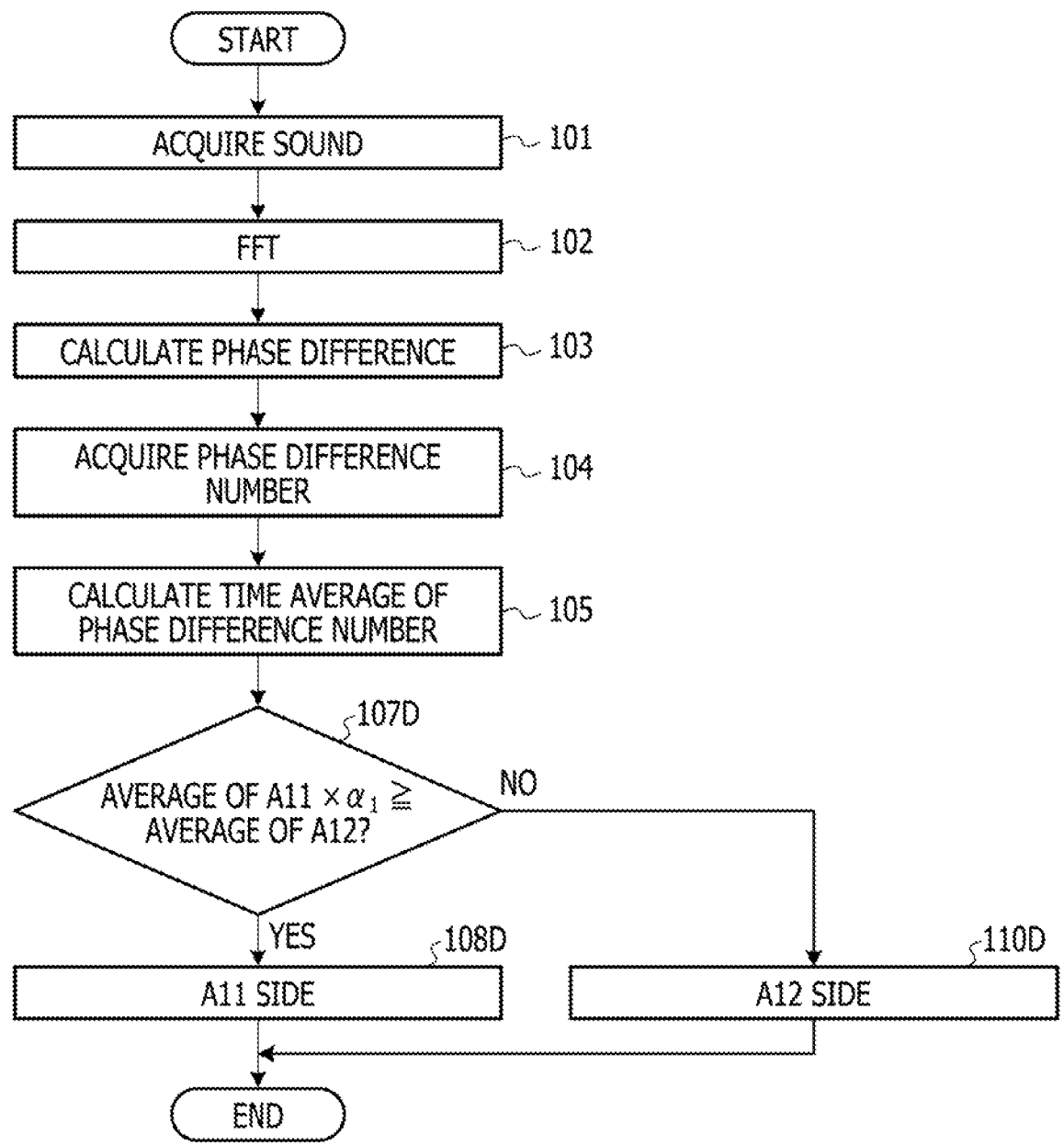
FIG. 14 is a flowchart exemplifying a flow of a speaker direction determination process according to the second embodiment.

Next, an outline of the operation of the speaker direction determination process will be described. In FIG. 14, steps 107, 108, and 110 in FIG. 7 are replaced with steps 107D, 108D, and 110D. In step 107D, the CPU 51 determines whether or not the value obtained by multiplying the time average of the phase difference number of the first phase difference region A11 by the correction coefficient $\alpha_1$ is equal to or greater than the time average of the phase difference number of the second phase difference region A12. If the determination in step 107D is affirmative, the CPU 51 proceeds to step 108D, determines that the speaker direction is on the first phase difference region A11 side, and ends the speaker direction determination process.

If the determination in step 107D is negative, that is, the value obtained by multiplying the time average of the phase difference number of the first phase difference region A11 by the correction coefficient $\alpha_1$ is smaller than the time average of the phase difference number of the second phase difference region A12, the CPU 51 proceeds to step 110D. In step 110D, the CPU 51 determines that the speaker direction is on the second phase difference region A12 side, and ends the speaker direction determination process.

Figure 15:
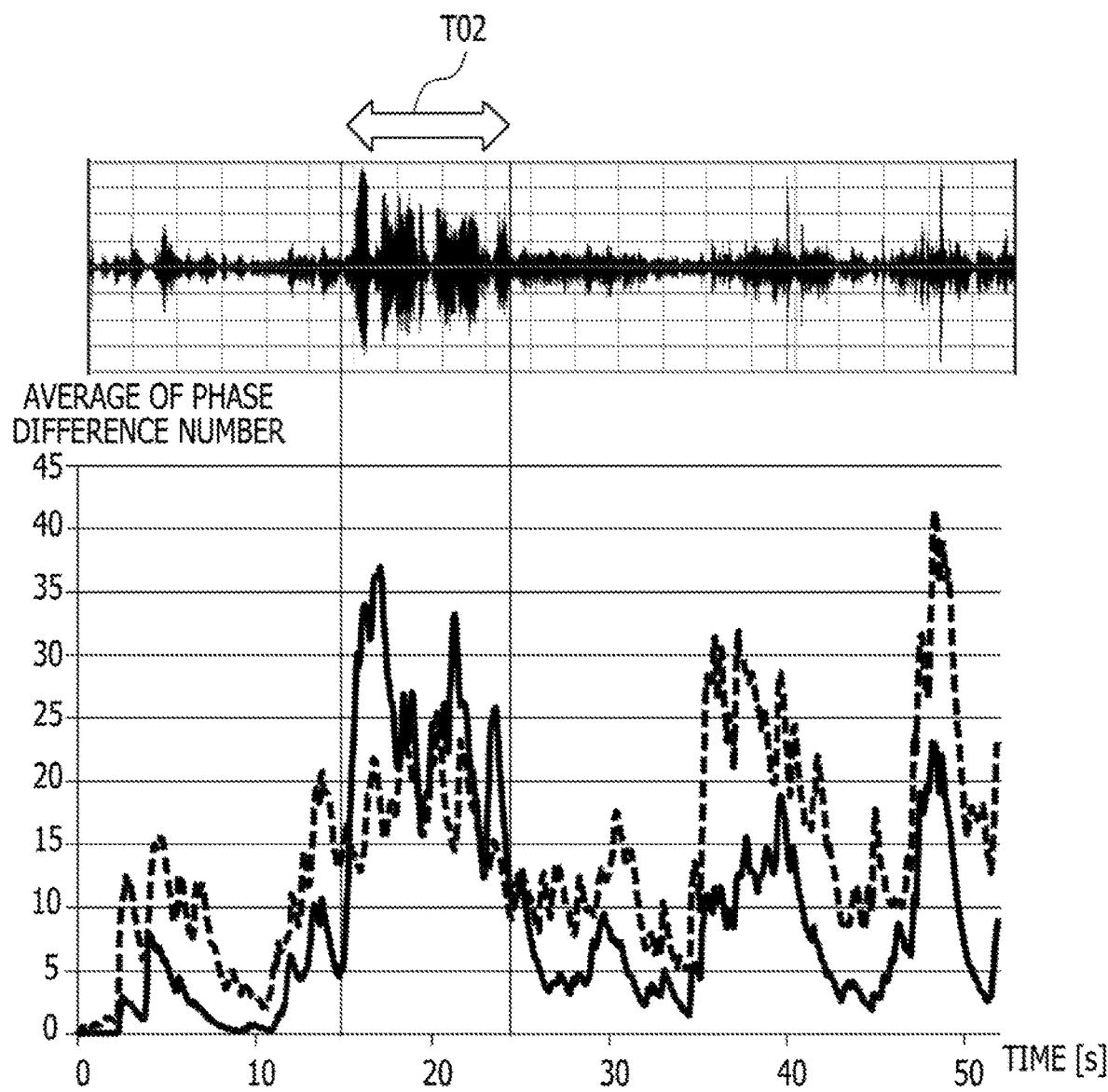
FIG. 15 is a conceptual diagram exemplifying a time average of the number of phase differences for each phase difference region.

By applying the correction coefficient $\alpha_1$, at time T02, which is a speech time of the speaker P11 exemplified in the upper diagram of FIG. 15, the time average of the phase difference number of the first phase difference region A11 becomes larger than the time average of the phase difference number of the second phase difference region A12 as exemplified in the lower diagram of FIG. 15. Consequently, at time T02, it is appropriately determined that the speaker P11 is speaking.

Note that while an example has been described in which the time average of the phase difference number of the first phase difference region A11, which is the narrower phase difference region, is multiplied by the correction coefficient, the embodiment is not limited to this. For example, the time average of the phase difference number of the second phase difference region A12, which is the wider phase difference region, may be divided by the correction coefficient. Alternatively, a correction coefficient $\alpha_{1D}$ may be calculated by equation (6), and the time average of the phase difference number of the second phase difference region A12, which is the wider phase difference region, may be multiplied by the correction coefficient $\alpha_{1D}$.

$$\alpha_{1D} = (\pi r^2 \times \theta_A/360)/(\pi r^2 \times \theta_B/360) = \theta_A/\theta_B \quad (6)$$

In the embodiment, multiple speaker regions are set in different directions with respect to a microphone array including multiple microphones, and the phase difference in each of multiple different frequency bands is calculated on the basis of multiple sound signals acquired by the multiple microphones. Based on the calculated phase differences and each of the multiple phase difference regions corresponding to each of the set multiple speaker regions, a representative value of the number of phase differences belonging to each of the multiple phase difference regions is calculated. The magnitudes of the calculated representative values are compared, and the direction of the speaker region of the phase difference region having the larger representative value is determined to be the direction in which the speaker exists.

In the embodiment, when the sizes of the multiple speaker regions are different, a corrected representative value obtained by correcting a representative value using a correction coefficient for correcting the difference in the sizes of the multiple speaker regions is used to determine the direction in which the speaker exists.

In the embodiment, since the speaker direction is determined on the basis of the representative value of the number of phase differences in each of the multiple phase difference regions, it is possible to improve the accuracy in determining the direction in which a speaker exists in a highly noisy environment. Additionally, even when the sizes of the multiple speaker regions are different, since the corrected representative value obtained by correcting a representative value using a correction coefficient for correcting the difference in the sizes of the multiple speaker regions is used, it is possible to improve the accuracy in determining the direction in which the speaker exists.

Third Embodiment

Hereinafter, an example of a third embodiment will be described in detail with reference to the drawings. The description of the configuration and operation similar to those of the first and second embodiments will be omitted.

Figure 16:
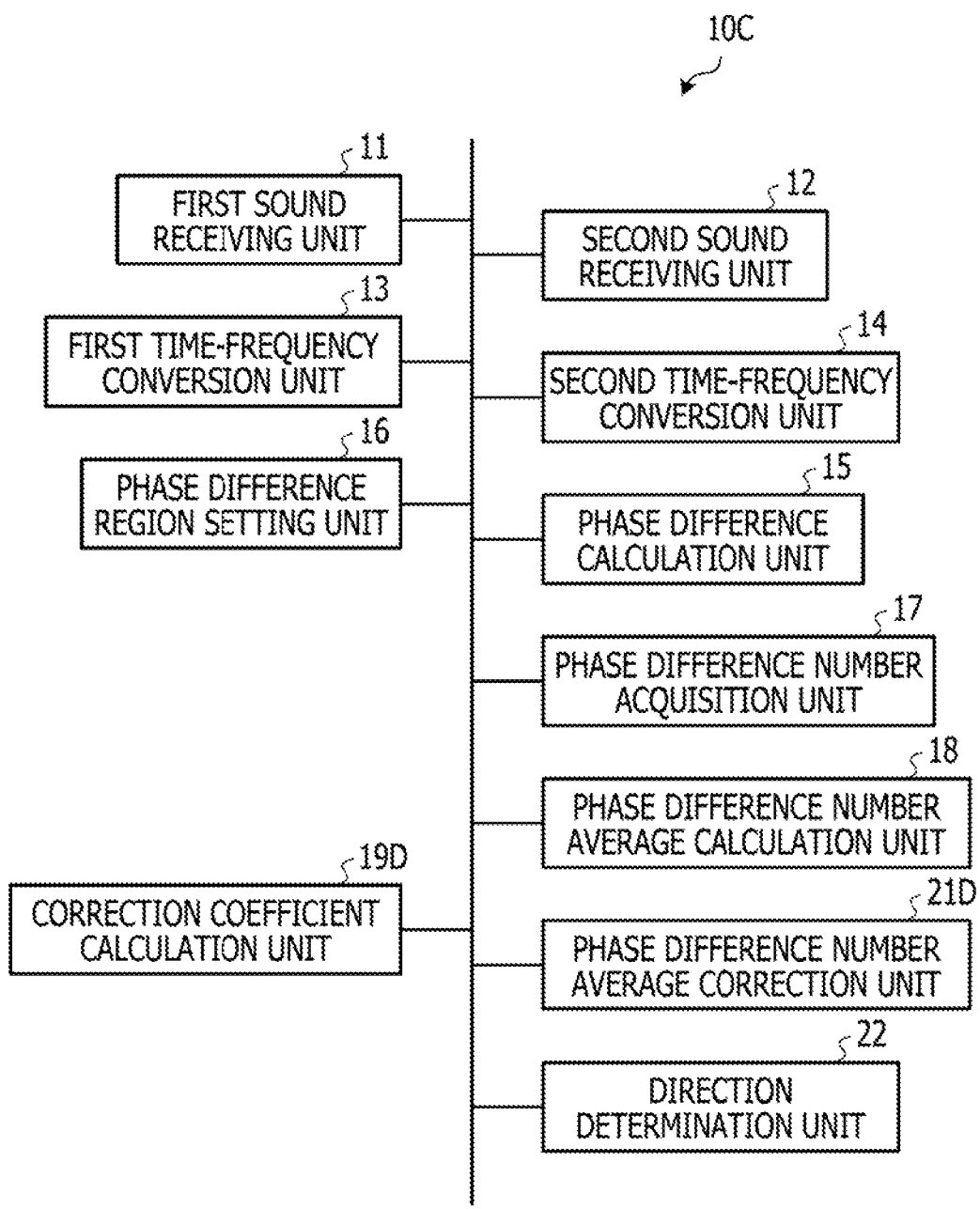
FIG. 16 is a block diagram exemplifying a speaker direction determination device according to the third embodiment.

The third embodiment differs from the second embodiment in that the correction coefficient is calculated on the basis of the time average of the phase difference number. A speaker direction determination device 10C exemplified in FIG. 16 differs from the speaker direction determination device 10B of the second embodiment exemplified in FIG. 8 in that the speaker direction determination device 10C includes a correction coefficient calculation unit 19D instead of the correction coefficient calculation unit 19 and a phase difference number average correction unit 21D instead of the phase difference number average correction unit 21.

Figure 17:
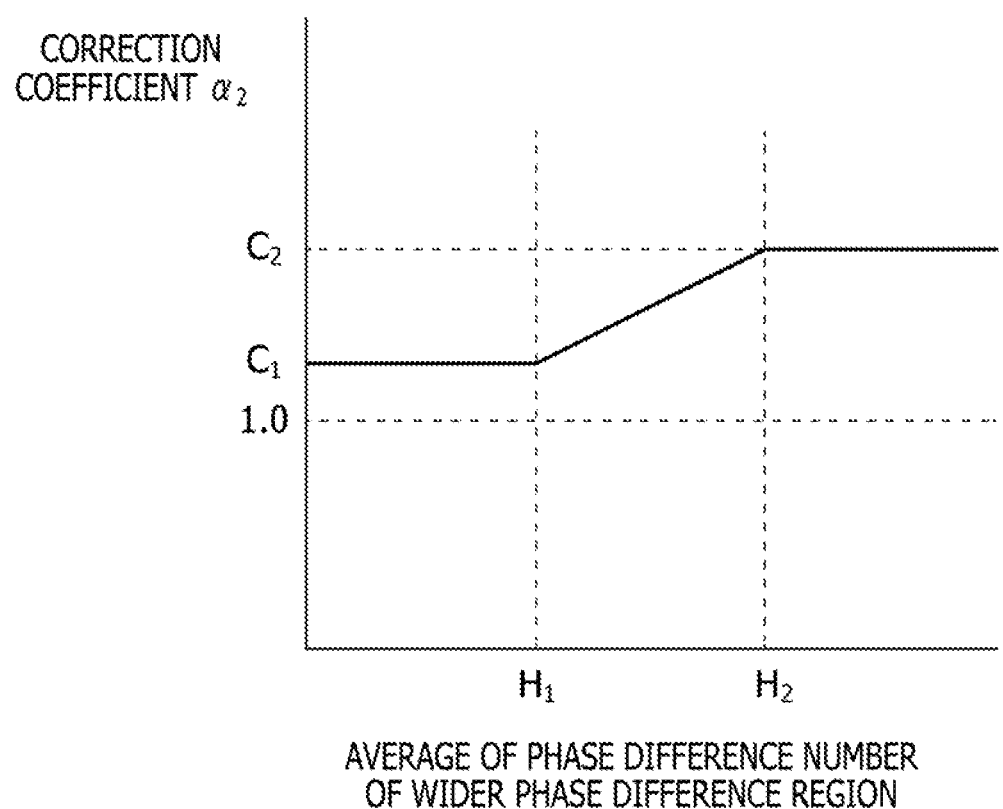
FIG. 17 is a conceptual diagram exemplifying a correction coefficient according to the third embodiment.

The correction coefficient calculation unit 19D calculates a correction coefficient $\alpha_2$ using equation (7) as exemplified in FIG. 17, for example. avg is the time average of the phase difference number of the wider phase difference region, and $C_1$, $C_2$, $H_1$, and $H_2$ are predetermined constants.

$$\alpha_2 = C_1 (\geq 1.0) \text{ (when avg} \leq H_1)$$

$$\alpha_2 = C_2 (>C_1) \text{ (when avg} \geq H_2(>H_1))$$

$$\alpha_2 = C_1 + (C_2 - C_1) \times (\text{avg} - H_1)/(H_2 - H_1)$$

$$\text{(when } H_1 < \text{avg} < H_2) \quad (7)$$

In FIG. 17, the horizontal axis represents the time average of the phase difference number of the wider phase difference region, and the vertical axis represents the correction coefficient $\alpha_2$.

Figure 18:
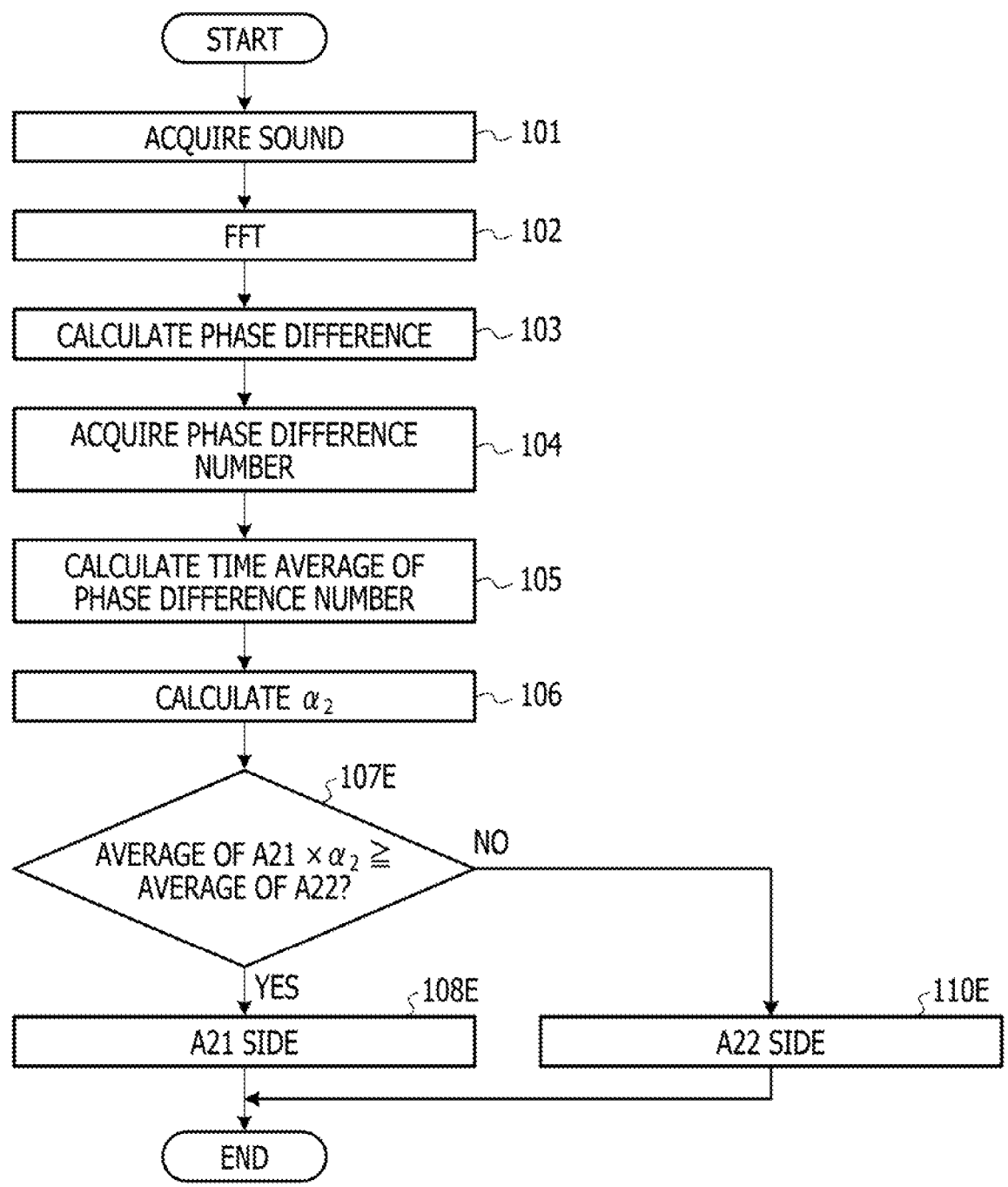
FIG. 18 is a flowchart exemplifying a flow of a speaker direction determination process according to the third embodiment.
Figure 19:
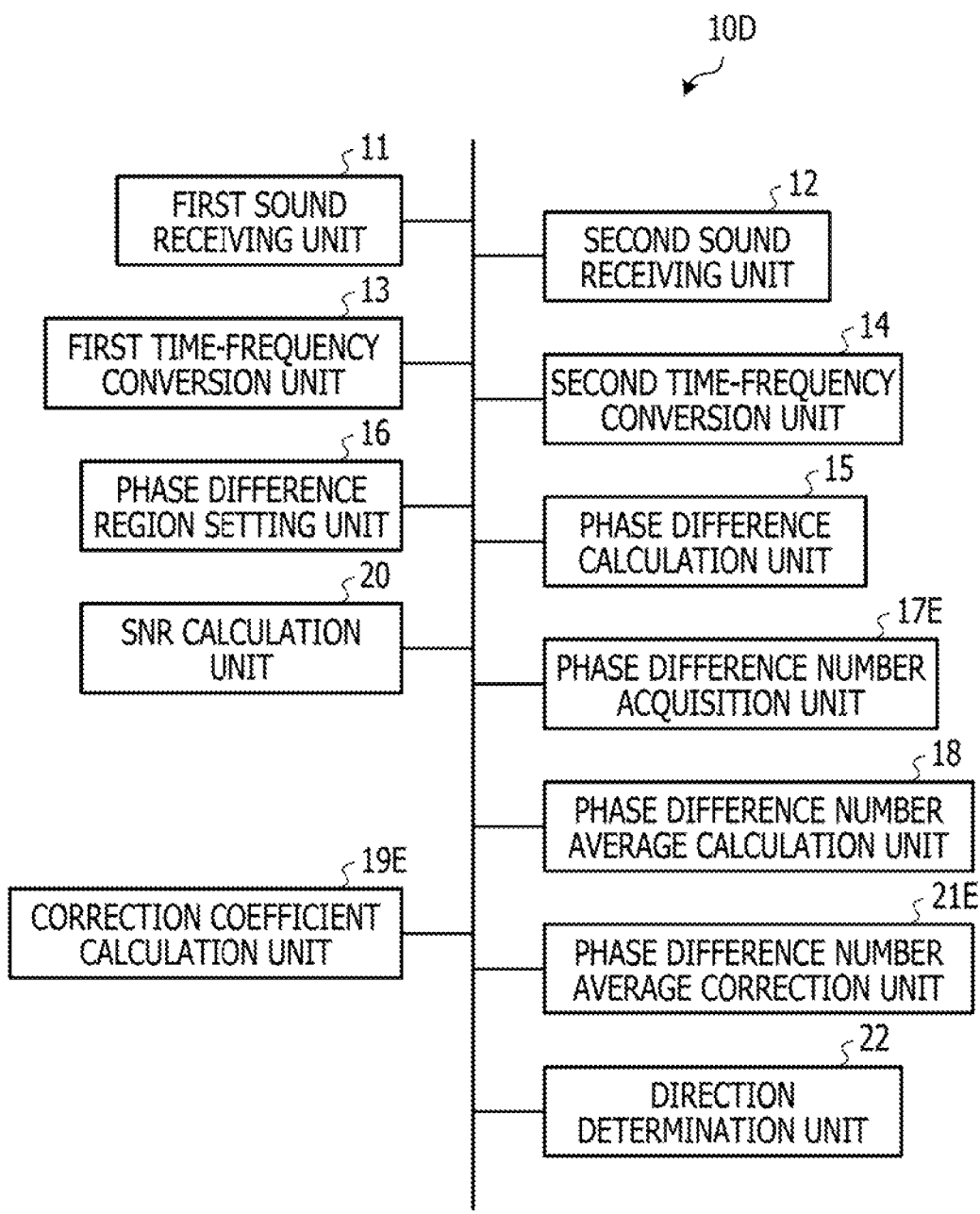
FIG. 19 is a block diagram exemplifying a speaker direction determination device according to the fourth embodiment.

Next, an outline of the operation of the speaker direction determination process will be described. FIG. 18 differs from FIG. 14 in that a step 106 of calculating the correction coefficient $\alpha_2$ is added after step 105, and steps 107D, 108D, and 110D are replaced with steps 107E, 108E, and 110E, respectively. In step 106, the correction coefficient $\alpha_2$ is calculated using equation (7), for example.

In step 107E, it is determined whether or not a value obtained by multiplying the time average of the phase difference number of a first phase difference region A21, which is a phase difference region corresponding to the narrower speaker region, by the correction coefficient $\alpha_2$ is equal to or greater than the time average of the phase difference number of a second phase difference region A22. If the determination in step 107E is affirmative, in step 108E, the CPU 51 determines that the speaker direction is on the first phase difference region A21 side, and ends the speaker direction determination process.

If the determination in step 107E is negative, that is, the value obtained by multiplying the time average of the phase difference number of the first phase difference region A21 by the correction coefficient $\alpha_2$ is smaller than the time average of the phase difference number of the second phase difference region A22, the CPU 51 proceeds to step 110E. In step 110E, the CPU 51 determines that the speaker direction is on the second phase difference region A22 side, and ends the speaker direction determination process.

Note that in the embodiment, a correction coefficient for absorbing the difference in the phase difference number due to the difference in the area of the speaker region is calculated on the basis of the time average of the phase difference number of the phase difference region corresponding to the wider speaker region. In the embodiment, the calculated correction coefficient is applied to the time average of the phase difference number of the phase difference region corresponding to the narrower speaker region. However, the embodiment is not limited to this. A correction coefficient for absorbing the difference in the phase difference number due to the difference in area may be calculated on the basis of the time average of the phase difference number of the phase difference region corresponding to the narrower speaker region, and the calculated correction coefficient may be applied to the time average of the phase difference number of the phase difference region corresponding to the wider speaker region.

In the embodiment, multiple speaker regions are set in different directions with respect to a microphone array including multiple microphones, and the phase difference in each of multiple different frequency bands is calculated on the basis of multiple sound signals acquired by the multiple microphones. Based on the calculated phase differences and the set multiple speaker regions, a representative value of the number of phase differences belonging to each of the multiple phase difference regions corresponding to each of the multiple speaker regions is calculated. The magnitudes of the calculated representative values are compared, and the direction of the speaker region corresponding to the phase difference region having the larger representative value is determined to be the direction in which the speaker exists.

In the embodiment, when the sizes of the multiple speaker regions are different, a corrected representative value obtained by correcting a representative value using a correction coefficient for correcting the difference in the sizes of the multiple speaker regions is used to determine the direction in which the speaker exists. The correction coefficient is determined on the basis of a representative value of any one of the multiple phase difference regions. The correction coefficient is determined so as to increase as the representative value used to determine the correction coefficient increases.

In the embodiment, since the speaker direction is determined on the basis of the representative value of the number of phase differences in each of the multiple phase difference regions, it is possible to improve the accuracy in determining the direction in which a speaker exists in a highly noisy environment. Additionally, even when the sizes of the multiple speaker regions are different, since the corrected representative value obtained by correcting a representative value using a correction coefficient for correcting the difference in the sizes of the multiple speaker regions is used, it is possible to improve the accuracy in determining the direction in which the speaker exists.

Additionally, in the embodiment, the correction coefficient is determined on the basis of a representative value of any one of the multiple phase difference regions. Since the correction coefficient fluctuates on the basis of the fluctuation of the time average of the phase difference number, it is possible to improve the accuracy in determining the direction in which the speaker exists.

Fourth Embodiment

Hereinafter, an example of a fourth embodiment will be described in detail with reference to the drawings. The description of the configuration and operation similar to those of the first, second, and third embodiments will be omitted.

The fourth embodiment differs from the first, second, and third embodiments in that the phase difference in a frequency band having a signal-to-noise ratio (hereinafter referred to as SNR) higher than a predetermined value is counted. Additionally, the fourth embodiment differs from the second and third embodiments in that the correction coefficient is calculated on the basis of an estimated value of a stationary noise model.

A speaker direction determination device 10D of the fourth embodiment includes an SNR calculation unit 20, as exemplified in FIG. 1g The speaker direction determination device 10D differs from the speaker direction determination device 10C in that the speaker direction determination device 10D has a phase difference number acquisition unit 17E and a phase difference number average correction unit 21E instead of the phase difference number acquisition unit 17 and the phase difference number average correction unit 21D.

The SNR calculation unit 20 estimates a stationary noise model for each frequency band of a sound signal in a frequency domain corresponding to a sound acquired by any of the multiple microphones. For the estimation of the stationary noise model, an existing technique as described in Patent Document 2 may be applied, for example. The phase difference number acquisition unit 17E calculates the SNR for each frequency band of the frequency-domain sound signal. The SNR can be calculated by dividing the amplitude of the sound pressure for each frequency band by the corresponding stationary noise model, for example.

If the calculated SNR is larger than a predetermined value, the phase difference number acquisition unit 17E counts the phase differences existing in each of the frequency bands in the phase difference region. For example, the phase difference number acquisition unit 17E counts the phase differences existing in the frequency band of a first phase difference region, and counts the phase differences existing in the frequency band of a second phase difference region. That is, when the SNR is equal to or less than the predetermined value, the phase difference of the frequency band is not counted.

Figure 20:
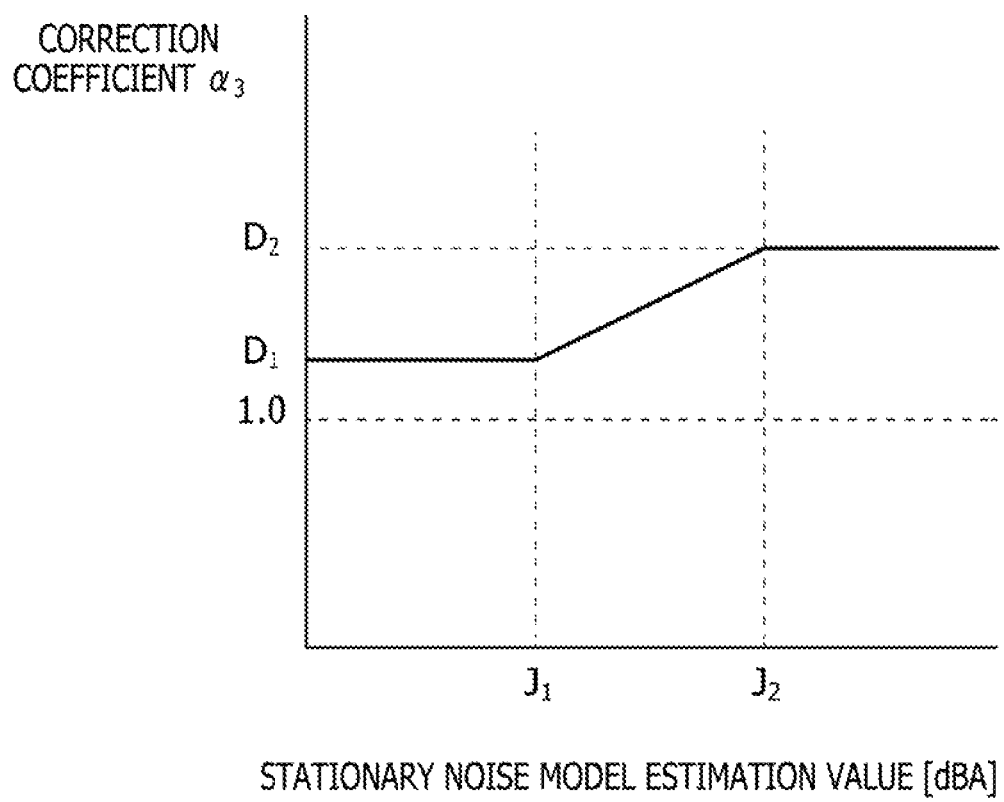
FIG. 20 is a conceptual diagram exemplifying a correction coefficient according to the fourth embodiment.

A correction coefficient calculation unit 19E calculates a correction coefficient $\alpha_3$ using equation (8) as exemplified in FIG. 20, for example. cnm is a stationary noise model estimation value [dBA] of the second phase difference region which is a phase difference region corresponding to a wider speaker region, and $D_1$, $D_2$, $J_1$, and $J_2$ are predetermined constants.

$$\alpha_3 = D_1 (\geq 1.0) \text{ (when } cnm \leq J_1)$$

$$\alpha_3 = D_2 (> D_1) \text{ (when } cnm \leq J_2 (> J_1))$$

$$\alpha_3 = D_1 + (D_2 - D_1) \times (cnm - J_1)/(J_2 - J_1)$$

$$\text{(when } J_1 < cnm < J_2) \quad (8)$$

In FIG. 20, the horizontal axis represents the stationary noise model estimation value [dBA], and the vertical axis represents the correction coefficient $\alpha_3$. In order to correct the time average of the phase difference number of the first phase difference region which is a phase difference region corresponding to the narrower speaker region, the time average is multiplied by the correction coefficient $\alpha_3$.

Figure 21:
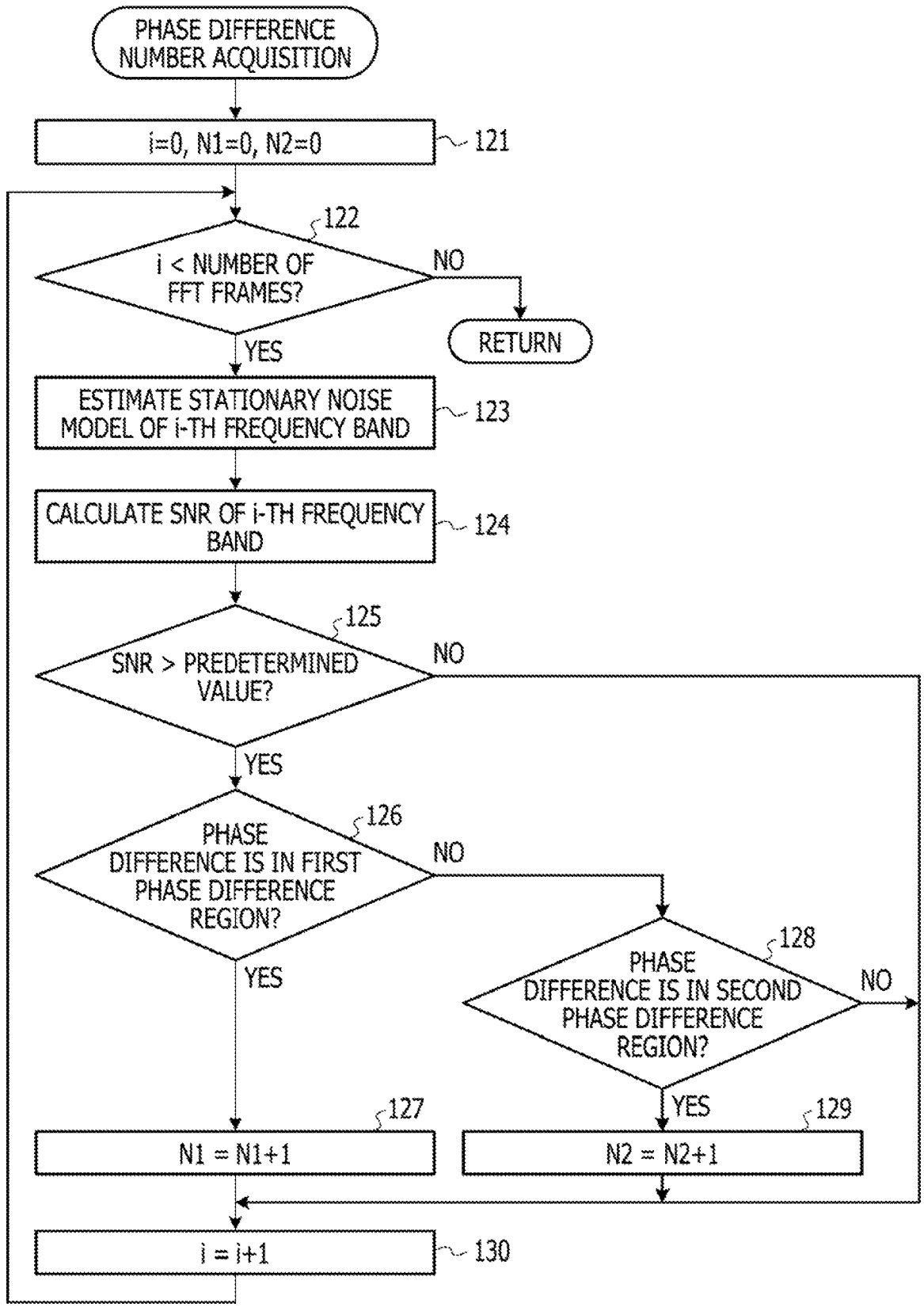
FIG. 21 is a flowchart exemplifying a flow of a phase difference number acquisition process according to the fourth embodiment.

Next, an outline of the operation of the speaker direction determination process will be described. Here, a description will be given of a phase difference number acquisition process different from those of the first to third embodiments. FIG. 21 exemplifies a flow of the phase difference number acquisition process. In step 121, the CPU 51 sets variables i, N1, and N2 to 0. The variable i is used to count the number of frequency bands, N1 is used to count the number of phase differences in the first phase difference region, and N2 is used to count the number of phase differences in the second phase difference region.

In step 122, the CPU 51 determines whether or not the value of the variable i is smaller than the number of FFT frames, that is, the maximum value of the number of frequency bands. If the determination in step 122 is affirmative, the CPU 51 estimates the stationary noise model of the i-th frequency band in step 123, and calculates the SNR of the i-th frequency band in step 124.

In step 125, the CPU 51 determines whether or not the SNR is larger than a predetermined value. If the determination in step 125 is affirmative, in step 126, the CPU 51 determines whether or not the phase difference of the i-th frequency band exists in the first phase difference region. If the determination in step 126 is affirmative, the CPU 51 adds 1 to the value of the variable N1 in step 127, and proceeds to step 130.

If the determination in step 126 is negative, in step 128, the CPU 51 determines whether or not the phase difference of the i-th frequency band exists in the second phase difference region. If the determination in step 128 is affirmative, the CPU 51 adds 1 to the value of the variable N2 in step 129, and proceeds to step 130. The CPU 51 also proceeds to step 130 when the determination in step 128 is negative.

The CPU 51 adds 1 to the variable i in step 130, and returns to step 122. If the determination in step 122 is negative, that is, if the value of the variable i is equal to or greater than the number of FFT frames, the CPU 51 ends the phase difference number acquisition process.

Note that in the embodiment, an example has been described in which the correction coefficient is calculated using equation (8). However, for example, in the embodiment, the correction coefficient described in the second and third embodiments may be used, or the correction coefficient calculated using equation (8) may be used in the example described in the second or third embodiment. Additionally, as similar to the example described in the first embodiment, the embodiment does not need to use a correction coefficient.

Note that while the embodiment describes an example in which the correction coefficient is calculated on the basis of the stationary noise model estimation value of the phase difference region corresponding to the wider speaker region, and the correction coefficient is applied to a representative value of the phase difference region corresponding to the narrower speaker region, the embodiment is not limited to this. For example, a correction coefficient for correcting a representative value of the phase difference region corresponding to the wider speaker region may be calculated on the basis of the stationary noise model estimation value of the phase difference region corresponding to the wider speaker region, and the correction coefficient may be applied to the phase difference region corresponding to the wider speaker region. Alternatively, a correction coefficient for correcting a representative value of the phase difference region corresponding to the wider speaker region may be calculated on the basis of the stationary noise model estimation value of the phase difference region corresponding to the narrower speaker region, and the correction coefficient may be applied to the phase difference region corresponding to the wider speaker region.

In the embodiment, multiple speaker regions are set in different directions with respect to a microphone array including multiple microphones, and the phase difference in each of multiple different frequency bands is calculated on the basis of multiple sound signals acquired by the multiple microphones. Based on the calculated phase differences and the set multiple speaker regions, a representative value of the number of phase differences belonging to each of the multiple phase difference regions corresponding to each of the multiple speaker regions is calculated. The magnitudes of the calculated representative values are compared, and the direction of the speaker region corresponding to the phase difference region having the larger representative value is determined to be the direction in which the speaker exists.

In the embodiment, when the sizes of the multiple phase difference regions are different, a corrected representative value obtained by correcting a representative value using a correction coefficient for correcting the difference in the sizes of the multiple phase difference regions is used to determine the direction in which the speaker exists. In the embodiment, the correction coefficient is determined so as to increase as the stationary noise model estimation value of any one of the multiple phase difference regions increases. Additionally, in the embodiment, a representative value of the number of phase differences in a frequency band in which a signal-to-noise ratio of a sound signal corresponding to a sound acquired by one of the multiple microphones is larger than a predetermined value is calculated.

In the embodiment, since the speaker direction is determined on the basis of the representative value of the number of phase differences in each of the multiple phase difference regions, it is possible to improve the accuracy in determining the direction in which a speaker exists in a highly noisy environment. Additionally, even when the sizes of the multiple phase difference regions are different, since the corrected representative value obtained by correcting a representative value using a correction coefficient for correcting the difference in the sizes of the multiple phase difference regions is used, it is possible to improve the accuracy in determining the direction in which the speaker exists.

In the embodiment, since the correction coefficient fluctuates on the basis of the fluctuation of the stationary noise model estimation value of any one of the multiple phase difference regions, it is possible to improve the accuracy in determining the direction in which the speaker exists. In the embodiment, a representative value of the number of phase differences in a frequency band in which a signal-to-noise ratio of a sound signal corresponding to a sound acquired by one of the multiple microphones is larger than a predetermined value is calculated. That is, since the phase difference in the frequency band with a high noise level is not counted, it is possible to improve the accuracy in determining the direction in which the speaker exists.

The flowcharts of FIGS. 7, 14, 18, and 21 are examples, and the order of the process may be changed as appropriate.

Note that while an example of a translation system that performs translation using the speaker direction determination result has been described, the embodiment is not limited to this. For example, the speaker direction determination result may be used to determine the speaker on the basis of the speaker direction in a minutes generation system.

Comparative Example

FIG. 22 exemplifies the accuracy rate of speaker direction determination when two speaker regions have different sizes, that is, when phase difference regions have different sizes. The accuracy rate of speaker direction determination in the wider phase difference region is 90.1[%] when the correction coefficient is not used as in the first embodiment, and is improved to 100.0 [%] when the correction coefficient is used as in the second and third embodiments.

The accuracy rate of speaker direction determination in the narrower phase difference region is 59.8[%] when the correction coefficient is not used, and is improved to 59.8[%] when using a fixed correction coefficient calculated on the bass of an area ratio of the phase difference region and the like as in the second embodiment. Additionally, the accuracy rate of speaker direction determination in the narrower phase difference region is improved to 81.0[%] when using a fluctuating correction coefficient calculated on the basis of the time average of the phase difference number of the phase difference region as in the third embodiment and the like.

Figure 23:
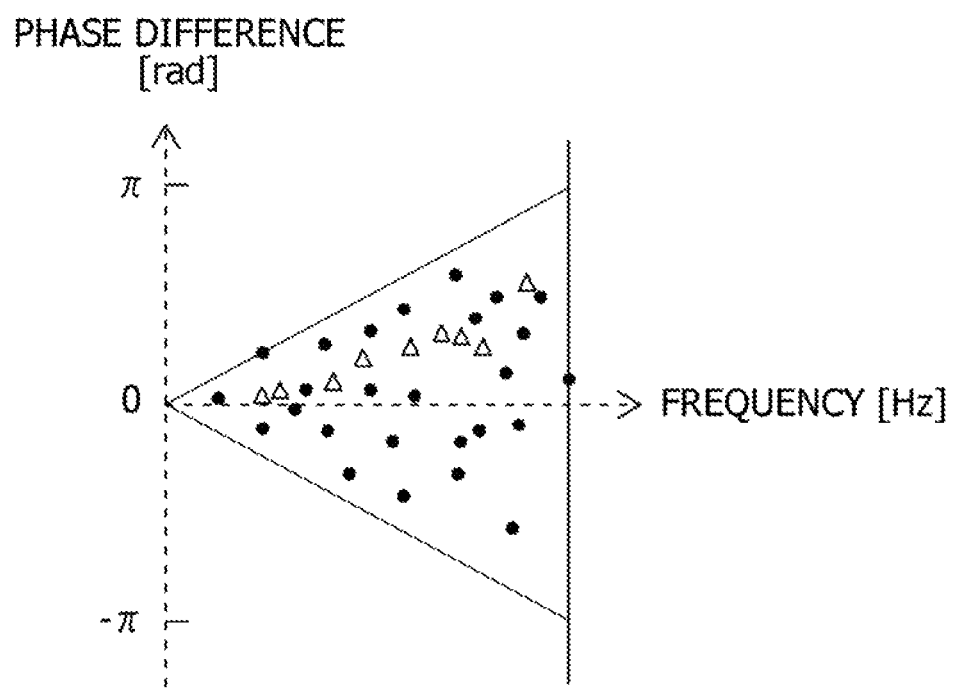
FIG. 23 is a conceptual diagram exemplifying phase differences included in phase difference regions.
Figure 24:
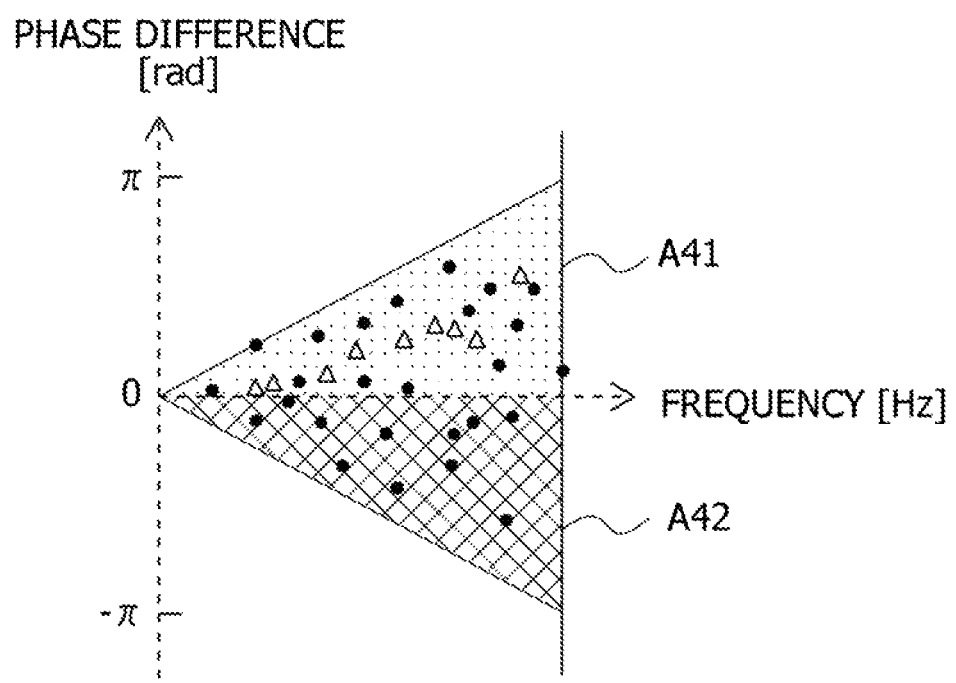
FIG. 24 is a conceptual diagram exemplifying phase differences included in phase difference regions.

In the related art, the average of the phase difference from the lower limit frequency band to the upper limit frequency band of the sound is used. Accordingly, as exemplified in FIG. 23, the phase difference of noise represented by the circle is mixed with the phase difference of speech represented by the triangle, which affects the average of the phase difference. Hence, it may be difficult to appropriately determined the speaker direction. On the other hand, in the embodiment, as exemplified in FIG. 24, the time averages of the phase difference number of multiple phase difference regions such as a first phase difference region A41 and a second phase difference region A42 are compared, for example. Accordingly, even if there are phase differences of noise, the phase differences have a similar effect on both phase difference regions. Hence, it is possible to properly determine the speaker direction and improve the accuracy in determining the speaker direction.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:

by using a plurality of microphones as a base point of a plurality of speaker regions, setting the plurality of speaker regions in different directions, the plurality of speaker regions including at least a first speaker region and a second speaker region, the setting of the first speaker region being configured to set the first speaker region in a first direction, the setting of the second speaker region being configured to set the second speaker region in a second direction different from the first direction;

calculating a phase difference in each of a plurality of different frequency bands on the basis of a plurality of sound signals acquired by the plurality of microphones;

calculating, for each of a plurality of phase difference regions, a first value indicating the number of calculated phase differences belonging to that phase difference region, the plurality of phase difference regions being regions corresponding to the plurality of speaker regions;

calculating, for each of the plurality of phase difference regions, a representative value of the first value calculated during a predetermined time period;

comparing magnitudes of the representative values calculated for the plurality of phase difference regions; and determining, as a speaker direction in which a speaker exists, a direction of a speaker region corresponding to a phase difference region where the compared representative value is large, wherein the determining of the speaker direction is configured to:

calculate, for a first phase difference region, a correction coefficient for correcting a difference in sizes of the plurality of speaker regions, the first phase difference region being any of the plurality of phase difference region and having an area smaller than remains of the plurality of phase difference regions;

correcting the representative value for the first phase difference region by using the calculated correction coefficient; and determining the present direction of the speaker by using the corrected representative value.

2. The storage medium according to claim 1, wherein the correction coefficient is calculated from an area ratio of each of the plurality of speaker regions.

3. The storage medium according to claim 1, wherein the correction coefficient is determined on the basis of the representative value of any one of the plurality of phase difference regions.

4. The storage medium according to claim 1, wherein the correction coefficient is determined on the basis of a stationary noise model estimation value of any one of the plurality of phase difference regions.

5. The storage medium according to claim 1, wherein a representative value of the number of phase differences in a frequency band in which a signal-to-noise ratio of a sound signal corresponding to a sound acquired by one of the plurality of microphones is larger than a predetermined value is calculated.

6. The storage medium according to claim 1, wherein the representative value is a time average.

7. A speaker direction determination method executed by a computer, the speaker direction determination method comprising:
by using a plurality of microphones as a base point of a plurality of speaker regions, setting the plurality of speaker regions in different directions, the plurality of speaker regions including at least a first speaker region and a second speaker region, the setting of the first speaker region being configured to set the first speaker region in a first direction, the setting of the second speaker region being configured to set the second speaker region in a second direction different from the first direction;
calculating a phase difference in each of a plurality of different frequency bands on the basis of a plurality of sound signals acquired by the plurality of microphones;
calculating, for each of a plurality of phase difference regions, a first value indicating the number of calculated phase differences belonging to that phase difference region, the plurality of phase difference regions being regions corresponding to the plurality of speaker regions;
calculating, for each of the plurality of phase difference regions, a representative value of the first value calculated during a predetermined time period;
comparing magnitudes of the representative values calculated for the plurality of phase difference regions; and
determining, as a speaker direction in which a speaker exists, a direction of a speaker region corresponding to a phase difference region where the compared representative value is large,
wherein the determining of the speaker direction is configured to:
calculate, for a first phase difference region, a correction coefficient for correcting a difference in sizes of the plurality of speaker regions, the first phase difference region being any of the plurality of phase difference region and having an area smaller than remains of the plurality of phase difference regions;
correcting the representative value for the first phase difference region by using the calculated correction coefficient; and
determining the present direction of the speaker by using the corrected representative value.

8. A speaker direction determination device comprising:
a memory; and
a processor coupled to the memory and the processor configured to:
by using a plurality of microphones as a base point of a plurality of speaker regions, set the plurality of speaker regions in different directions, the plurality of speaker regions including at least a first speaker region and a second speaker region, the setting of the first speaker region being configured to set the first speaker region in a first direction, the setting of the second speaker region being configured to set the second speaker region in a second direction different from the first direction;
calculate a phase difference in each of a plurality of different frequency bands on the basis of a plurality of sound signals acquired by the plurality of microphones;
calculating, for each of a plurality of phase difference regions, a first value indicating the number of calculated phase differences belonging to that phase difference region, the plurality of phase difference regions being regions corresponding to the plurality of speaker regions;
calculate, for each of the plurality of phase difference regions, a representative value of the first value calculated during a predetermined time period;
compare magnitudes of the representative values calculated for the plurality of phase difference regions; and
determine, as a speaker direction in which a speaker exists, a direction of a speaker region corresponding to a phase difference region where the compared representative value is large,
wherein the determining of the speaker direction is configured to:
calculate, for a first phase difference region, a correction coefficient for correcting a difference in sizes of the plurality of speaker regions, the first phase difference region being any of the plurality of phase difference region and having an area smaller than remains of the plurality of phase difference regions;
correcting the representative value for the first phase difference region by using the calculated correction coefficient; and
determining the present direction of the speaker by using the corrected representative value.

9. The speaker direction determination device according to claim 8, wherein
the correction coefficient is calculated from an area ratio of each of the plurality of speaker regions.

10. The speaker direction determination device according to claim 8, wherein
the correction coefficient is determined on the basis of the representative value of any one of the plurality of phase difference regions.

11. The speaker direction determination device according to claim 8, wherein
the correction coefficient is determined on the basis of a stationary noise model estimation value of any one of the plurality of phase difference regions.

12. The speaker direction determination device according to claim 8, wherein
a representative value of the number of phase differences in a frequency band in which a signal-to-noise ratio of a sound signal corresponding to a sound acquired by one of the plurality of microphones is larger than a predetermined value is calculated.

13. The speaker direction determination device according to claim 8, wherein
the representative value is a time average.

* * * * *